United States Patent
Kruis et al.

(10) Patent No.: US 7,817,988 B2
(45) Date of Patent: Oct. 19, 2010

(54) SYSTEM AND METHOD FOR REAL TIME SELF-PROVISIONING FOR A MOBILE COMMUNICATION DEVICE

(75) Inventors: David P. Kruis, Waterloo (CA); Barry J. Gilhuly, Waterloo (CA)

(73) Assignee: Research In Motion Limited, Waterloo (CA)

( * ) Notice: Subject to any disclaimer, the term of this patent is extended or adjusted under 35 U.S.C. 154(b) by 1989 days.

(21) Appl. No.: 10/489,433

(22) PCT Filed: Sep. 10, 2002

(86) PCT No.: PCT/CA02/01373

§ 371 (c)(1),
(2), (4) Date: Mar. 9, 2004

(87) PCT Pub. No.: WO03/024139

PCT Pub. Date: Mar. 20, 2003

(65) Prior Publication Data

US 2004/0242209 A1    Dec. 2, 2004

(30) Foreign Application Priority Data

Sep. 10, 2001    (CA) .................................... 2356823

(51) Int. Cl.
H04M 3/42    (2006.01)
H04M 1/725    (2006.01)
H04L 29/06    (2006.01)
H04W 4/00    (2009.01)

(52) U.S. Cl. .............. 455/414.1; 455/412.1; 455/412.2; 455/413; 455/435.1

(58) Field of Classification Search .............. 455/414.1, 455/435.1, 413, 412.1, 412.2
See application file for complete search history.

(56) References Cited

U.S. PATENT DOCUMENTS

| 5,764,899 | A | | 6/1998 | Eggleston et al. |
| 5,946,630 | A | * | 8/1999 | Willars et al. ............... 455/466 |
| 6,519,470 | B1 | * | 2/2003 | Rydbeck ...................... 455/466 |
| 6,628,934 | B2 | * | 9/2003 | Rosenberg et al. .......... 455/411 |
| 2002/0034945 | A1 | * | 3/2002 | Hamada ...................... 455/435 |

FOREIGN PATENT DOCUMENTS

| EP | 0 994 608 A2 | 4/2000 |
| WO | WO 99/65256 A3 | 12/1999 |
| WO | WO 01/50779 A1 | 7/2001 |

* cited by examiner

*Primary Examiner*—George Eng
*Assistant Examiner*—Wesley L Kim
(74) *Attorney, Agent, or Firm*—Jones Day; Krishna K. Pathiyal; Robert C. Liang

(57) ABSTRACT

A system and method of provisioning services for a mobile communication device are disclosed. A provisioning request including provisioning information and specifying a provisioning operation and a first communication service is prepared on the mobile communication device and sent to a provisioning system. Processing of the provisioning request is dependent upon whether or not a second communication service has been activated for the mobile communication device. If the mobile communication device is outside a coverage area of a wireless communication network when a provisioning request is prepared, the request is stored at the mobile communication device and sent to the provisioning system when the mobile communication device enters the coverage area. The provisioning system preferably manages service provisioning for multiple services, any of which may be hosted by different service providers.

18 Claims, 14 Drawing Sheets

SYSTEM AND METHOD FOR REAL TIME SELF-PROVISIONING FOR A MOBILE COMMUNICATION DEVICE

CROSS-REFERENCE TO RELATED APPLICATION

This application is related to and claims priority from Canadian Application 2,356,823, filed on Sep. 10, 2001.

FIELD OF INVENTION

This invention relates to provisioning of services for a mobile communication device.

DESCRIPTION OF PRIOR ART

When a user purchases a mobile communication device ("mobile device"), the mobile device normally cannot operate on a communication network until it has been activated on the network.

Traditional systems and methods of activating mobile devices involve the use of an activation code, which is obtained by the user from a network operator or service provider. In order to activate the mobile device, the user must typically first communicate a unique mobile device number to the network operator via an alternate form of communication. This initial communication is usually telephone-based, but may instead be accomplished through email or a different network such as the World Wide Web or Internet.

In the case of telephone-based activation, the user must provide the network operator with activation information by voice over a telephone, which is an immensely error-prone and time-consuming means of activation. The activation information varies with particular mobile devices and networks, but usually includes at least the unique mobile device number and often also includes user billing and charging information. Some automated telephone-based systems use touch tones to allow the user to enter the activation information using a telephone keypad, but this is also an extremely error-prone and time-consuming means of activation.

These difficulties are compounded by the often lengthy delay in activation, which may involve a further return call by the network operator to the user at a telephone number specified by the user to provide an activation code to the user. As those skilled in the art will appreciate, activation codes and the task of entering such a code into a mobile device vary significantly between different devices, networks and service providers. A user may therefore require further guidance from a network operator to properly enter the activation code manually into the mobile device.

Some mobile device vendors and service providers attempt to alleviate the above problems by having a sales person activate a new device at the point of sale. Although the activation is performed for the user by another person, the user must normally wait while the activation is completed in order to provide required personal and billing information. Thus, whether the actual activation process is performed by the user or by a person acting on behalf of the user, mobile device activation remains a time consuming process for the user.

The preceding description relates primarily to initial activation of a mobile device. It should be appreciated that similar problems and delays are experienced by a user each time the user wishes to add, remove or modify any mobile device-related services offered by a network operator.

There remains a need for a system and method of activating a mobile device essentially "right out of the box", by which a user can activate the mobile device without a complicated or time-consuming activation scheme.

There remains a further more general need for a system and method which allows a user to manage device services directly on a mobile device.

SUMMARY

It is an object of the invention to provide a system and method of activating a mobile communication device by which a user can activate the mobile communication device using only the mobile communication device itself.

It is a further object of the invention to provide a system and method for real-time self-provisioning of services on a mobile communication device.

According to an aspect of the invention, a system and method are provided to allow a user to manage mobile communication device services in real time using the device.

In one embodiment, when a user first turns on a mobile communication device, the mobile communication device itself is used to collect relevant information from the user, thereby completing a user profile. This user profile is preferably stored on the mobile communication device and includes the user information, the unique mobile communications device number and any other required information.

In the case of initial activation, when the user profile is complete, a software application on the mobile communication device sends the user profile in a provisioning request to a provisioning authority using a temporary provisioning network activation code. Soon after the provisioning authority receives a provisioning request sent from a mobile communication device, the mobile communication device receives a provisioning response sent in real time by the provisioning authority. Upon receiving the provisioning response, the mobile communication device acts on the information obtained in the response. In the above example of initial activation, the provisioning response includes a network activation code that is utilized by the mobile communication device in order to activate the device on the network in real time.

A method of provisioning services for a mobile communication device, according to an aspect of the invention, comprises the steps of receiving a provisioning request, the provisioning request including provisioning information and specifying a provisioning operation and a first communication service, determining whether a second communication service has been activated for the mobile communication device, and, where the second service has been activated for the mobile communication device, then processing the provisioning information to determine whether the provisioning operation may be performed, performing the provisioning operation for the first communication service where the provisioning operation may be performed, preparing a provisioning response indicating the result of the processing, and sending the provisioning response to the mobile communication device.

According to a further aspect of the invention, a method of provisioning multiple services for a mobile communication device comprises the steps of receiving a provisioning request, the provisioning request including provisioning information and specifying a provisioning operation, a base communication service and a related communication service, processing the provisioning information to determine whether the provisioning operation may be performed for the base service, and, where the provisioning operation may be performed for the base communication service, then performing the provisioning operation for the base communication service, processing the provisioning information to determine whether the provisioning operation may be performed for the related communication service, performing the provisioning operation for the related communication service where the provisioning operation may be performed for the related communication service, preparing a provisioning response indicating that the provisioning operation was successful, and sending the provisioning response to the mobile communication device.

In another aspect of the invention, a method for provisioning communication services using a mobile communication device configured to operate within a wireless communication network comprising the steps of preparing a provisioning request at the mobile communication device, transmitting the provisioning request to a provisioning authority where the mobile communication device is within a coverage area of the wireless communication network, and, where the mobile communication device is outside the coverage area of the wireless communication network, storing the provisioning request at the mobile communication device, and transmitting the provisioning request to the provisioning authority when the mobile communication device enters the coverage area.

A service provisioning system for a mobile communication device, according to a still further aspect of the invention, comprises means for receiving a provisioning request, the provisioning request including provisioning information and specifying a provisioning operation and a first communication service, means for determining whether a second communication service has been activated for the mobile communication device, means for processing the provisioning information to determine whether the provisioning operation may be performed, where the second communication service has been activated for the mobile communication device, and means for performing the provisioning operation for the first communication service where the provisioning operation may be performed, wherein the provisioning operation for the first communication service is dependent upon activation of the second communication service.

In another aspect of the invention, a mobile communication device configured to operate within a wireless communication network comprises means for preparing a provisioning request, means for storing the provisioning request, and means for transmitting the provisioning request to a provisioning authority when the mobile communication device enters a coverage area of the wireless communication network.

A provisioning authority system for managing service provisioning for mobile communication devices in a wireless communication system comprises at least one provisioning interface, means for receiving a provisioning request, operatively associated with each of the at least one interface systems, means for extracting provisioning information from the provisioning request, and means for distributing the provisioning information, wherein the means for distributing distributes the provisioning information to one of a plurality of means for processing provisioning information.

Further features of the invention will be described or will become apparent in the course of the following detailed description.

BRIEF DESCRIPTION OF THE DRAWINGS

In order that the invention may be more clearly understood, several preferred embodiments thereof will now be described in detail by way of example, with reference to the accompanying drawings, in which.

DETAILED DESCRIPTION OF PREFERRED EMBODIMENTS

Provisioning is a general term that is commonly used in the field of mobile communications in reference to the process by which services provided by a service provider are managed. Initial service provisioning, whereby a mobile communication device is first configured for operation within a communication network, is normally termed activation.

Figure 1:
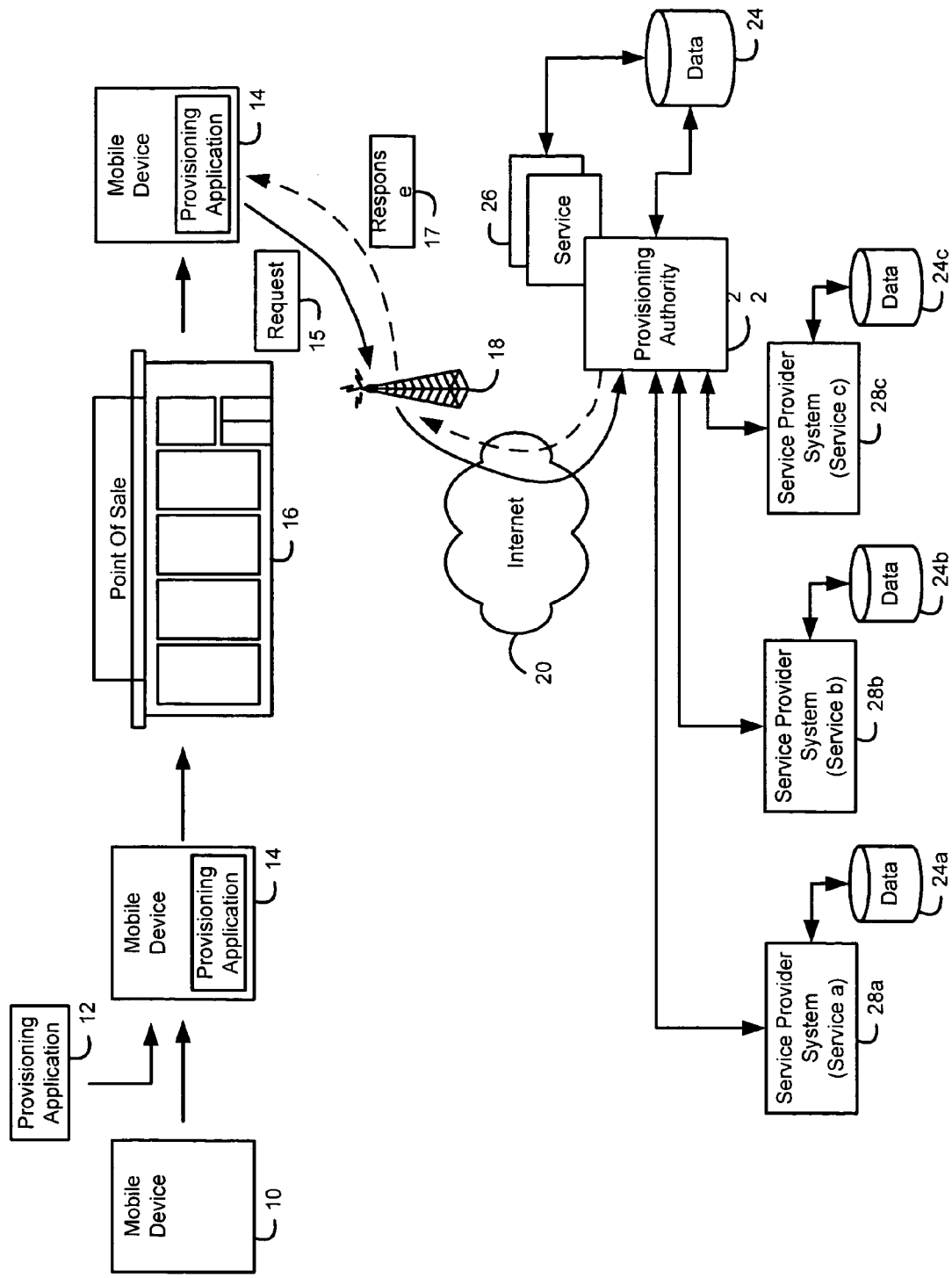
FIG. 1 is a system diagram illustrating self-provisioning in accordance with an embodiment of the invention.

Referring to FIG. 1, after the manufacturing of a mobile device 10, a provisioning software application 12, which will be described in further detail below, is installed on the mobile device 10. As those skilled in the art will appreciate, installation of the provisioning application 12 may instead be accomplished during the manufacturing process, for example by storing the provisioning application 12 into a read only memory (ROM) or other non-volatile store which is installed into the mobile device 10 and accessible by a processor (not shown) in the mobile device 10. In a particularly preferred embodiment, the provisioning application 12 is provided by a manufacturer of the mobile device 10, although it is contemplated that the provisioning application 12 may instead be provided by a network operator of a communication network in which the mobile device 10 is intended to operate or by a further external service provider or software application developer.

The manufacturing and provisioning application installation procedures could be adapted to accommodate any such provisioning application supply arrangement. Where the provisioning application 12 is designed by the mobile device manufacturer, the provisioning application 12 is preferably installed during manufacturing. If a network operator or external developer supplies the provisioning application 12, then the application could be either supplied to the mobile device manufacturer for installation during device manufacturing or loaded to the mobile device 10 after manufacturing. Although the physical mobile device 10 is not substantially changed by the installation of the provisioning application 12, a mobile device on which the provisioning application 12 has been installed is labelled as 14 in FIG. 1. The mobile device 10 may be an otherwise fully operational communication device, but would require activation and provisioning in accordance with a known process such as one of those described above.

Since the information required for activation and further service provisioning is normally different for different services, network operators and other service providers, the provisioning application 12 may be adapted for the network on which the mobile communications device 14 will operate. The provisioning application 12 may also be customized for different network protocols and billing schemes. These and other design criteria of the provisioning application 12 will be described in further detail below.

When a mobile device 14 is purchased at a point of sale 16, the provisioning application 12 may be invoked. The provisioning application 12 preferably reads any available information required for service provisioning, such as a mobile device identification code or number, for example, from the mobile device 14. The user is then prompted for any further required information and a provisioning request 15 is transmitted from the mobile device 14, through a mobile communication network 18 in which the device 14 is designed to operate and through a further network such as the Internet 20 to a provisioning authority 22. The provisioning authority 22 stores the information provided in the provisioning request 15 to a data store 24 and processes the provisioning request 15. A provisioning response 17 is then generated by the provisioning authority 22 and returned to the mobile device 14. The provisioning response 17 indicates whether access to any services specified in the provisioning request 15 has been granted or denied and provides any further information as may be required by the mobile device 14 to make use of such services. In accordance with an aspect of the invention, an initial provisioning request 15 and response 17 exchange activates a new mobile device on a network. A further aspect of the invention provides for execution of the provisioning application 12 to allow a user to manage and customize mobile device services.

As described briefly above, the provisioning application 12 may be supplied by an external source such as a network operator or service provider or by the mobile device manufacturer. When the provisioning application 12 is a custom application from a service provider, the provisioning authority 22 is normally associated with a particular service or group of services 26. The provisioning authority 22 also performs provisioning functions for services a, b and c, associated with service provider systems 28a-28c. Therefore, the provisioning authority 22 manages service provisioning for the services 26 provided by the owner or operator of the provisioning authority 22 and services a-c associated with service provider systems 28a-28c, provided by other service providers. In alternate embodiments, a provisioning authority may be configured to manage only services provided by an owner or operator of the provisioning authority or only those offered by other service providers. In FIG. 1, the provisioning authority 22 manages provisioning of external services a-c, and as such may be considered to be a provisioning service provider, in that the owner or operator is providing the service of provisioning external services. The provisioning authority 22 allows a service provider to make a service, such as the services a-c, available to a mobile device 14 without having to implement a provisioning system, thereby significantly reducing costs to the service provider while simplifying provisioning of the service by a user of the mobile device 14.

Figure 2:
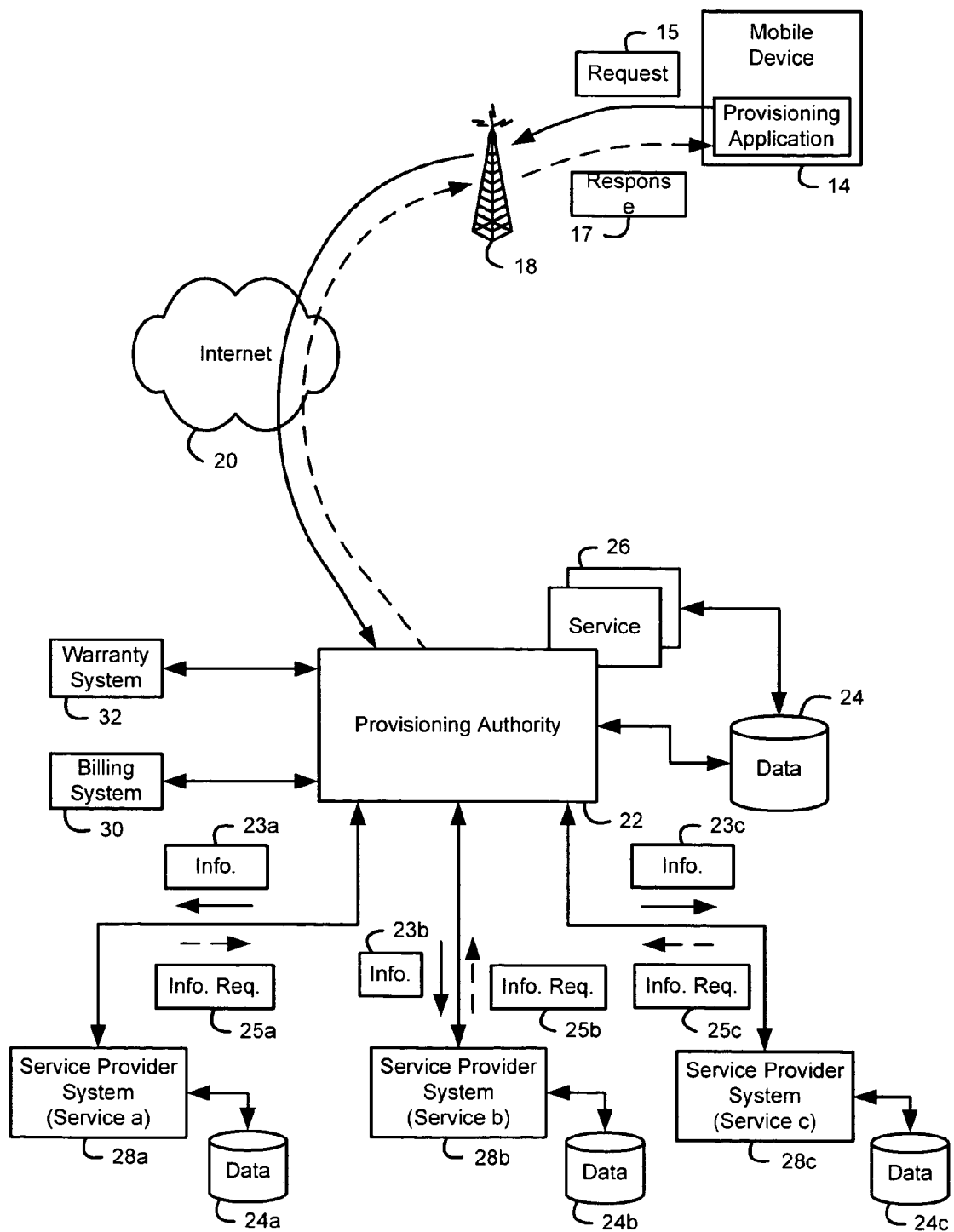
FIG. 2 is a block diagram of a provisioning system according to the embodiment of FIG. 1.

FIG. 2 is a block diagram of a provisioning system according to the embodiment of FIG. 1. As described above, the provisioning application 12 may be invoked by a user to initially activate the mobile device 14 on a communication network 18. An initial provisioning (activation) request 15 is sent from the mobile device 14 to the provisioning authority 22 with which the provisioning application 12 is designed to operate. For the purpose of illustration, the service a is assumed to be a network communication service or carrier service, provided by a network operator or carrier which owns or operates the service provider system 28a, external to the provisioning authority 22. The provisioning application 14 and the provisioning authority 22 are preferably configured to obtain from a user and the mobile device 14 all information required by the carrier providing the carrier service a. The provisioning authority 22 is further configured to provide such information to the service provider system 28a in a predetermined format compatible with processing arrangements associated with the service provider system 28a.

For example, the service provider system 28a may transmit to the provisioning authority 22 a message indicating required activation information, including, for example, user name, mobile device identification number, method of payment for services, credit card number and the like. Most preferably, the provisioning application developer is aware of at least the activation information required by the service provider system 28a for activation of the mobile device 14, and therefore either retrieves available information within the mobile device 14 or prompts the user to input any further required activation information before a provisioning request 15 is sent to the provisioning authority 22. These details relating to required activation information may be stored, for example, in a service provider profile associated with the carrier at the provisioning authority 22. The provisioning authority 22 then provides all required activation information to the service provider system 28a for processing and storage in its associated data store 24a. This ensures that the mobile device 14 is activated quickly via a single provisioning request 15. Service provider profiles for each service provider, or possibly each service, may similarly be stored at the provisioning authority 22 and managed by each service provider. The provisioning authority 22 then determines the provisioning information required to provision services from any service provider using the service provider profiles.

From time to time, in response to changing conditions or in order to provide enhanced services, for example, a carrier may determine that further information must be provided before a mobile device 14 may be activated on the carrier's network. The provisioning application 12 may then be updated accordingly for installation in new mobile devices. However, if a user purchases a mobile device 14 in which an older version of the provisioning application 12 had been installed, the carrier may deny access to the network since not all of the required activation information will be supplied in the initial provisioning request. In such a situation, the information extracted from the provisioning request 15, indicated at 23a in FIG. 2, is preferably sent by the provisioning authority 22 to the service provider system 28a, which determines that the information is not sufficient for activation of the mobile device 14 on the associated network 18. The service provider system 28a then transmits a further information request 25a back to the provisioning authority 22, which preferably provides for some form of communication with the provisioning application 12 beyond simply responding to the provisioning requests 15. The provisioning application 12 then either prompts the user for the additional required information or retrieves the information if stored on the mobile device 14 and transmits the information to the provisioning authority 22. Any further information received from the mobile device 14 is forwarded to the service provider system 28a, which then activates the mobile device 14 on its network 18 and sends a service approval indication to the provisioning authority 22. The provisioning authority 22 then sends the provisioning response 17 to the mobile device 14 to complete the activation process. The mobile device 14 may then be used for communications over the network 18. Information extracted from provisioning requests is also forwarded to the service provider systems 28b and 28c, as shown at 23b and 23c, respectively. Further provisioning information requests 25b and 25c are also made, when necessary, by the service provider systems 28b and 28c.

Alternatively, when the provisioning application 12 is updated to include further information in the provisioning request as described briefly above, the updated provisioning application may be sent to all mobile devices activated in a communication network that currently use an older version of the provisioning application. Since the updated version of the provisioning application is distributed to all mobile devices in a network, any subsequent provisioning requests include all required information, thereby avoiding additional information requests for the further information, such as 25a, 25b and 25c. The provisioning authority 22 might instead perform a check to determine if a provisioning application 12 should be updated, by checking a provisioning application version number included in a provisioning request, for example, the first time a mobile device 14 contacts the provisioning authority 22 after a service provider has changed its provisioning information requirements. In the event of a positive determination, an updated provisioning application is sent to the mobile device 14 over the air, through the network 18. Any mobile devices using the provisioning authority 22 are thereby eventually provided with the updated provisioning application.

The system shown in FIG. 2 includes further functional blocks such as a billing system 30 and warranty system 32. Although these further systems do not provide communication services, some of the information collected from a mobile device 14 and a user thereof is pertinent to such systems. For example, the billing system 30 might be used to keep track of airtime used for provisioning services. A service provider may then be billed for such airtime as a cost of provisioning services provided by the provisioning authority 22. A mobile device identification number, user name and date of activation may be provided to the warranty system 32 by the provisioning authority 22. Thus, where different systems are connected to the provisioning authority 22, the provisioning authority 22 may be configured to provide different information to each system. These types of systems may also or instead be part of one or more of the service provider systems 28s, 28b and 28c, with any pertinent information being supplied to such systems by the respective service provider system. A further advantage of the single provisioning authority 22 is that additional systems may be added as required and supplied with required data from the provisioning authority 22.

Figure 3:
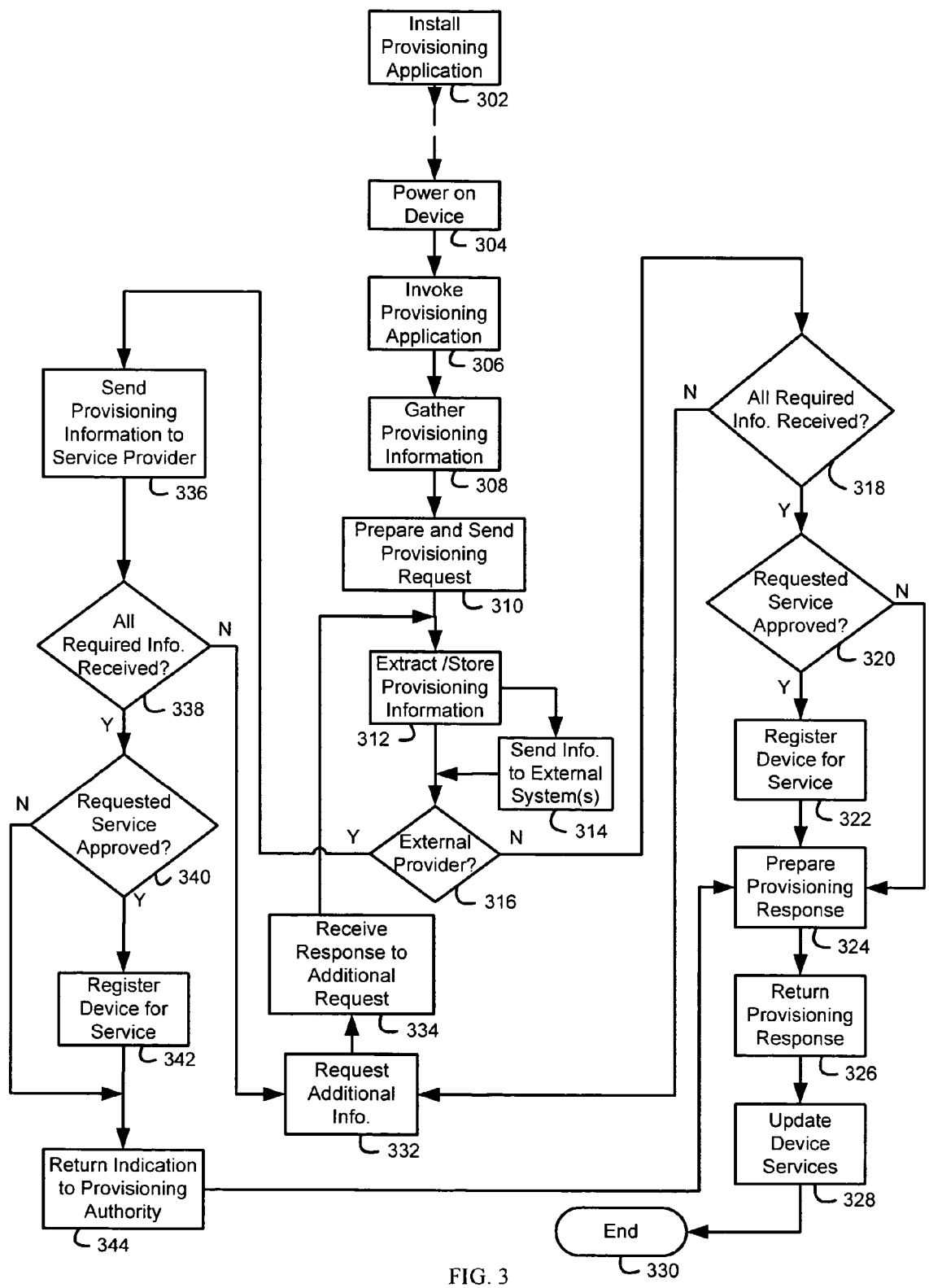
FIG. 3 is a flow diagram illustrating a provisioning process according to an embodiment of the invention.

FIG. 3 is a flow diagram illustrating a provisioning process according to an embodiment of the invention. As described above, a provisioning application is installed in a mobile device during or after manufacturing, at step 302. At some time later, after the mobile device with the provisioning application is purchased and first powered on at step 304, the provisioning application is invoked at step 306. Although shown in FIG. 3 as two distinct steps 304 and 306, powering on the mobile device may automatically invoke the provisioning application. Alternatively, the provisioning application may be invoked following a different predetermined event, such as when a power source in the mobile device has been charged to a specified level or when the mobile device first enters a coverage area of a communication network after being powered on, for example. The provisioning application might also require that the user manually enter a code or function call to begin a mobile device activation or service provisioning process.

When the provisioning application has been invoked, provisioning information such as user name, a mobile device identification number, a service plan selection and the like, which may be specified in a service provider profile at a provisioning authority, is gathered from the user and/or from a storage location in a mobile device memory component, as indicated at step 308. In step 310, a provisioning request is prepared and sent to the provisioning authority. If the mobile device is out of communication network coverage or is otherwise unable to communicate over the network when the provisioning request is prepared, the request is preferably stored on the mobile device and sent to the provisioning authority, either automatically or responsive to a user input, when the mobile device is able to communicate over the network, such as upon re-entry into a network coverage area.

The provisioning authority extracts the provisioning information from the received request and stores the extracted information to local data store at step 312. Where the provisioning authority manages external services for other service providers, as shown in FIGS. 1 and 2, the storage of provisioning information may be temporary, such that information records for clients of external service providers are not maintained after a provisioning process is completed.

Sensitive provisioning information such as credit card numbers or other billing details might also be encrypted by the mobile device 14 before the provisioning request is sent in order to keep such information confidential. Any encrypted information is then preferably decrypted only by a provisioning authority "client", such as a service provider system or an external system such as the billing system 30 or warranty system 32 (FIG. 2). The provisioning system therefore does not have access to sensitive information relating to users that subscribe only to external services not operated by the provisioning authority 22.

If external systems require any of the information extracted from the provisioning request, then such information is forwarded to the external systems, at step 314.

In step 316, the provisioning authority determines whether the provisioning request relates to a service, if any, associated with the provisioning authority itself. Where the requested service is provided by an owner or operator of the provisioning authority, for example, the provisioning authority the determines whether all required provisioning information has been received, at step 318. A step 320 of determining whether the user or the mobile device should be granted access to the requested service is then performed, where all required provisioning information, which may be different for different services and service providers, has been received. Service is denied, for example, if invalid billing information or an invalid mobile device identification number has been provided. The provisioning authority or a service provider system, might also check to ensure that a credit card number does not correspond to a stolen credit card or that a mobile device identification number does not already exist in its client records. Other criteria for denial of service will be apparent to those skilled in the art and are considered to be within the scope of the present invention.

The mobile device is registered for the requested service at step 322 where the provisioning request is approved. When the requested service is network communication service, step 322 involves activation of the mobile device on a communication network.

A provisioning response is prepared at step 324 and sent back to the mobile device at step 326. If the mobile device requires any further information in order to make use of an approved service for which it has been registered, then such information is preferably included in the provisioning response. The mobile device is configured to update an available services list or menu at step 328 when a requested service has been successfully provisioned. If the requested service is denied at step 320, then an appropriate provisioning response is prepared at step 324 and returned to the mobile device at step 326. At step 328, the mobile device then updates a record of services for which a provisioning request has been denied, possibly including the reason for denial of service. The user is then able to determine whether or not a further provisioning request for the same service should be submitted at a later time. The provisioning process then ends at step 330. After initial provisioning or activation, a user may invoke the provisioning application at any time to manage the services installed on the mobile device, as described in further detail below.

Returning now to step 318, the provisioning authority requests any additional required provisioning information from the mobile device or user at step 332 where all required provisioning information has not been provided, for example if a service provider has changed the provisioning information that is required. When a response to the request for additional information is received from the mobile device at step 334, the additional information is extracted at step 312 and distributed to any external systems at step 314 if necessary. The process then continues at step 318 and proceeds as described above. Although not specifically shown in FIG. 3, it will be apparent that additional required information may similarly be requested by a system such as the billing system 30 or warranty system 32 (FIG. 2). System information requests may be distinct from service provider information requests, but some form of information request coordination is preferred in order to avoid multiple requests for the same information. When the provisioning application is kept current as described above, the provisioning request will include all required information and further information requests to the mobile device should therefore be minimal.

It may also be preferable to limit the number of times additional required information is requested. After a certain number of requests have been made for the same information, the provisioning process may proceed from step 318 to step 320, to determine whether access to the requested service should be granted without the missing required provisioning information. If access to the service is granted, the mobile device is registered for the service at step 322 and the process proceeds as described above. This granting of service might instead be a restricted or time limited access, such that a service provider may require that a user provide the missing information within a certain time period in order to maintain the service or to obtain access to certain aspects of a service. If the service is denied at step 320, then a provisioning response is prepared at step 324, indicating that some required provisioning information was not supplied and could not be obtained, and sent to the mobile device. Other arrangements intended to limit the amount of time or provisioning system resources engaged in repeated information requests may also be implemented at the provisioning authority or an external system which may request such additional information. For example, the provisioning authority may cancel an outstanding additional information request, prepare and forward an appropriate provisioning response or message to the mobile device, and send a message to the system requesting the additional information to indicate that the requested additional information could not be obtained where no response to the additional information request has been received within a predetermined maximum response time interval.

Where the service requested in the provisioning request is provided by an external provider, as determined at step 316, such as the carrier and service provider system 28a (FIG. 2) for initial device activation, then the extracted provisioning information is sent to the service provider system at step 336. At step 338, the service provider system determines whether or not all required provisioning information has been received, and if not, additional information is requested via the provisioning authority as described above, at steps 332 and 334. Where the provisioning authority stores service or service provider profiles, this check may instead be performed by the provisioning authority. When all required information is received, access to the service is either denied or approved at step 340 and, if approved, the mobile device is registered for the service at step 342. Step 340 may also be executed when additional information has been requested a predetermined number of times without success or an information request has timed out at the provisioning authority, as described above. The external service provider then returns to the provisioning authority an indication of that the service request has been approved or denied, and the provisioning authority then prepares (step 324) and returns (step 326) a provisioning response to the mobile device. Based on the provisioning response and the configuration of the mobile device, the mobile device updates lists of available and unavailable services at step 328.

The preceding description relates primarily to initial provisioning or activation of a mobile device 14 on a communication network 18. According to a further aspect of the invention, however, the provisioning application 12 in a mobile device 14 may also be executed by a user to manage the services to which he or she subscribes. After the mobile device 14 has been activated, further provisioning requests 15 may be sent to the provisioning authority 22. These further provisioning requests may add, remove or modify mobile device services, for example, and may relate to any services for which provisioning is accomplished through the provisioning authority 22. The provisioning process for such further provisioning requests proceeds substantially as described above.

Figure 4:
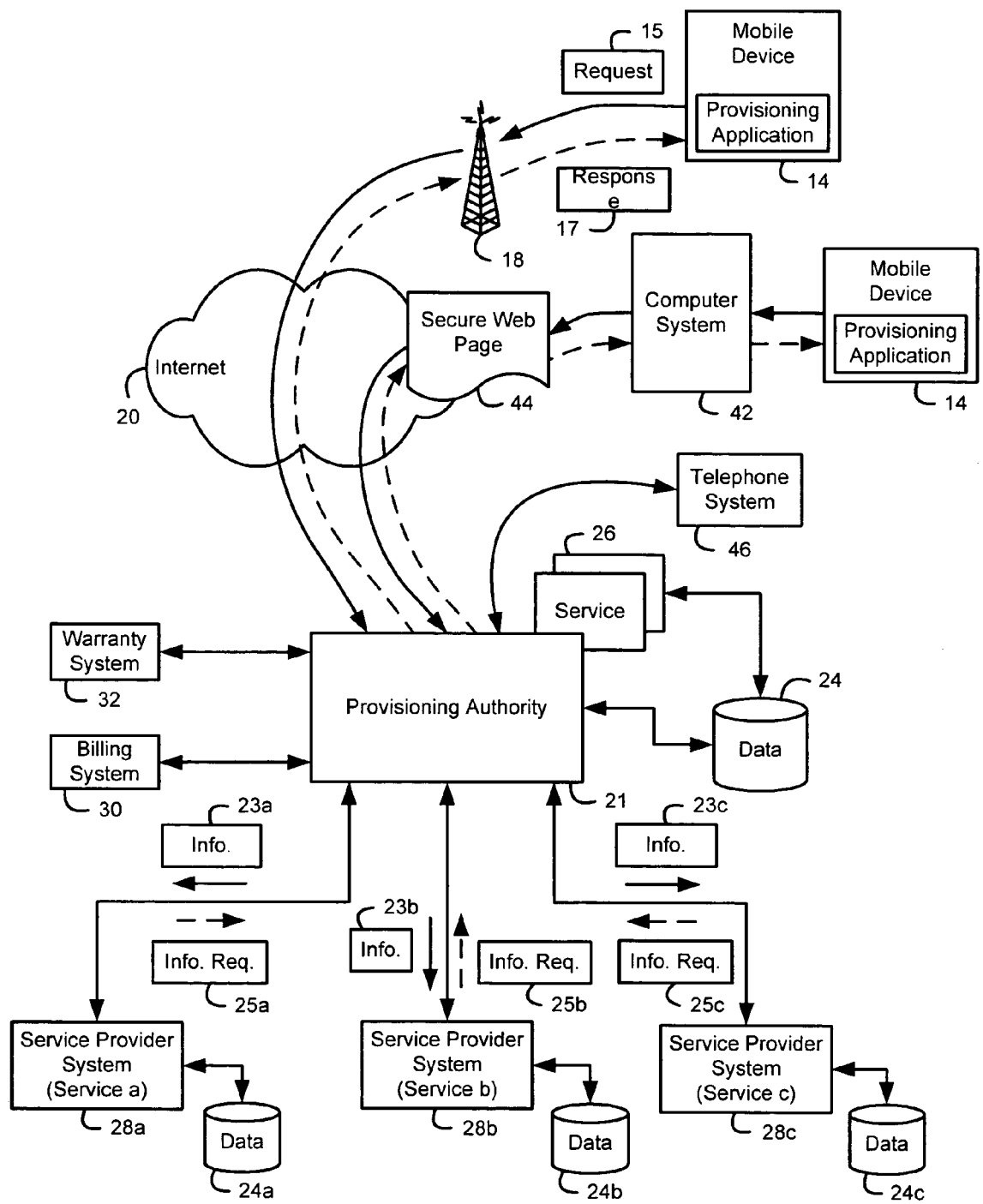
FIG. 4 is a block diagram-illustrating a provisioning system according to a further embodiment of the invention.

The systems shown in FIGS. 1 and 2 provide for provisioning of services for a mobile device 14 using only the mobile device 14 itself. In some circumstances however, a user may wish to provision services through an alternative interface. For example, a user may wish to activate a mobile device 14 or perform other provisioning services when the mobile device 14 is outside wireless network coverage. The user might also feel more comfortable using an interface with which he or she is more familiar than a newly-purchased mobile device 14. FIG. 4 is a block diagram illustrating a provisioning system according to a further embodiment of the invention. The provisioning system in FIG. 4 provides not only the self-provisioning functionality as described above, but also web-based and telephone-based provisioning. The provisioning authority 21 is substantially similar to the provisioning authority 22 shown in FIGS. 1 and 2 except that it supports web-based and telephone-based provisioning.

In the FIG. 4 system, a secure web page 44 is provided to allow a user to manage mobile device services through an internet-connected computer 42. The computer 42 is a desktop computer or a portable computer such as a laptop or palmtop computer. The connection of the computer 42 to the Internet 20 and thus the web page 44 is commonly a wired connection through an Internet Service Provider (ISP, not shown), although other connection schemes, such as through a wireless modem and a wireless network, are also contemplated.

When a connection to the secure web page 44 has been established, provisioning information required by the provisioning authority 21 or any service providers offering a requested service are entered into the computer 42 for transfer to the provisioning authority 21. In the embodiment shown in FIG. 4, the mobile device 14 is connected to the computer 42, through a serial connector, for example, so that mobile device information such as a mobile device identification number is transferred directly from the mobile device 14 to the computer 42, thereby reducing the amount of information that must be entered by the user. The provisioning process proceeds substantially as described above in conjunction with FIG. 3, except that provisioning requests and responses are exchanged between the provisioning authority 21 and the computer 42 instead of between the provisioning authority 21 and the mobile device 14.

Upon completion of a provisioning process, the mobile device 14 is informed of the approval or denial of the provisioning request. A provisioning response is preferably sent to both the computer 42 and the mobile device 14, provided that the mobile device 14 is within network coverage. The provisioning response might instead be sent to the mobile device 14 over the connection to computer 42. Otherwise, the provisioning application on the mobile device 14 may include a utility or function to send a "complete provisioning" or like request to the provisioning authority 21 when the mobile device 14 enters a coverage area of the communication network 18, in response to which the provisioning authority 21 then sends to the mobile device 14 the provisioning response and any information required for the mobile device 14 to use an approved service. When a shared computer 42 is used in the provisioning process however, the user may prefer to have the provisioning response sent only to the device 14 or perhaps to an alternate address. Such an alternate address may, for example, be specified in the provisioning request.

For telephone-based provisioning, a user contacts the provisioning authority 21 through the telephone system 46. Although it is preferred that such conventional provisioning interfaces as the telephone system are avoided by using the mobile device 14 and a provisioning application installed on the device to carry out provisioning operations, telephone-based provisioning is supported by the provisioning authority 21 in order to provide a familiar interface for new users, as described above. Telephone-based provisioning schemes do not typically involve a request and response mechanism, but interaction with an automated telephone system (not shown) or a service provider telephone operator or other customer service personnel that handle service provisioning for the user through a provisioning authority user interface (UI) (not shown). However, even if a user chooses telephone-based provisioning, some type of provisioning response is prepared by the provisioning authority 21 and sent to the mobile device 14 to indicate whether or not a service has been approved and to enable the mobile device 14 to use the service. If the mobile device 14 is within a coverage area of the communication network 18, the provisioning response is sent to the mobile device 14 upon completion of a provisioning process. The provisioning response is otherwise sent to the mobile device 14 when a "complete provisioning" or like request is received by the provisioning authority 21 when the mobile device 14 enters network coverage.

The provisioning system shown in FIG. 4 has the advantage for a service provider that only a single provisioning application or interface must be implemented. For example, the provisioning authority 21 may make appropriate application programming interfaces (APIs) available to any service provider that intends to effectively offload provisioning functions to the provisioning authority 21 instead of implementing a custom provisioning system. The APIs define information formats, function calls and the like that a service provider should support in order to communicate with and interpret information received from the provisioning authority 21. In the system of FIG. 4, the provisioning authority 21 provides potential clients of any of its associated service providers with a choice of device-based, web-based or telephone-based provisioning, while the service providers need support only a single interface to the provisioning authority 21. Thus, a service provider allows provisioning of its services via a mobile device 14 with a provisioning application, while also providing for more traditional provisioning schemes where a user of a mobile device 14 chooses to use a traditional provisioning scheme or a mobile device for which services are being provisioned is not capable of self-provisioning, i.e. no provisioning application has been installed on the mobile device.

A further advantage of a system as shown in FIG. 4, incorporating a provisioning authority 21 that supports multiple provisioning schemes, is that a user is not restricted to any particular provisioning scheme. For example, a user may not feel comfortable using a new mobile device 14 to provision mobile device services and may instead use the secure web page 44 or telephone system 46 for activation and any other initial service provisioning. When the user has become more familiar with the mobile device 14, however, the user may wish to provision new services or manage existing services using the provisioning application on the mobile device 14. Since all of these interfaces are supported by the single provisioning authority 21, the user may perform provisioning functions via any one of the interfaces at any time.

As those skilled in the art will appreciate, the activation of a mobile device on a communication network using the mobile device itself can be problematic in that carriers are normally reluctant to allow mobile devices to access communication networks prior to activation of the mobile devices on the networks. Without network access, a mobile device cannot communicate with a provisioning system such as the provisioning authority 21 or 22. One possible solution to this problem is to activate each mobile device on the communication network within which it is intended to operate, before the mobile device reaches the point of sale 16 (FIG. 1). For example, a mobile device could be activated before it leaves a manufacturing plant or when the provisioning application 12 is installed. Where network operators charge for services immediately after a mobile device is activated however, this activation of the mobile device prior to sale incurs costs which must either be absorbed by the mobile device manufacturer, the vendor of the mobile device or the service provider, or passed on to the consumer, none of which are desirable.

The provisioning system of FIG. 4 provides a more feasible solution to this network access problem in that a mobile device 14 may be activated through one of the alternate provisioning interfaces such as the web page 44 or the telephone system 46. After the mobile device 14 has been activated, provisioning requests and corresponding responses may be sent and received by the mobile device 14. Any subsequent service management functions can then be performed using the mobile device 14 and its resident provisioning application 12.

In a particularly preferred embodiment, the provisioning application 12 is the only software application that is permitted to access communication resources on a mobile device 14 before the mobile device 14 is activated on a network 18. All other communication-related software applications are initially restricted from performing any network communications functions. If a messaging application is installed on the mobile device 14, for example, a user may be able to compose and store a message, but until the mobile device 14 is activated on the network 18, no such message can be transmitted over the network 18. Software applications not requiring network resources, such as calendar applications, calculators, word processors, information synchronization applications which provide for synchronization of mobile device records with records on a user's PC, games, short-range communications applications and the like may be fully operational, but only the provisioning application is permitted to send and receive via the network 18.

This restriction on initial communications functionality effectively provides a mobile device 14 that, until properly activated on a network, may only call a provisioning authority 21 or 22, or perform any other legally required operations, such as placing 911 emergency calls where the mobile device 14 is a General Packet Radio Service (GPRS) mobile device. As such, a carrier need not be concerned that allowing the mobile device 14 to access the network 18 will provide free communication services. Since only the provisioning application 12 and other legally required software applications and operations are able to send and receive on the network 18, only provisioning functions and legally required functions may be performed. According to this embodiment, only the costs associated with the actual activation transaction must be covered by the manufacturer, vendor, carrier or user. Where a provisioning authority provides alternate provisioning interfaces, as in FIG. 4, the user may activate a mobile device using an alternate interface, such as the web page 44 or the telephone system 46, and thereby avoid any airtime charges associated with mobile device activation. Upon receipt of a provisioning response, regardless of the provisioning scheme used for mobile device activation, any other communication-related functions and software applications on the mobile device are enabled.

Initial communications restriction as described above is controlled on a mobile device itself. Such communications restrictions may instead be imposed at the communication network level or at a service provider level. For example, a carrier or service provider may be configured to detect that a mobile device has not been activated on a communication network or properly registered for communication services. Any communication operation between the mobile device and any other destination than the provisioning authority 21 or 22 is rejected until the mobile device is activated on the network and possibly registered for a particular service, unless support for other communication functions is required by law, as in the above example of 911 calls.

In a GPRS network, a subscriber identity module or SIM card in a mobile device must be populated before the mobile device is fully functional on the network. As those skilled in the art will appreciate, a mobile device must also establish a packet data protocol (PDP) context prior to communicating over the network. According to an aspect of the invention, a carrier can easily determine, from this PDP context, that a mobile device is not yet activated on the network and thus can only communicate with a provisioning authority such as 21 or 22. The carrier may then allow the mobile device to send a provisioning request to the provisioning authority in order to activate the mobile device for network service. The information required by the SIM card is then preferably provided in the provisioning response. The provisioned network communication services are thereafter fully operational on the mobile device. Alternatively, a GPRS carrier or service provider may determine the status of a mobile device by accessing a home location register (HLR) or possibly a visitor location register (VLR) in the network.

Figure 5:
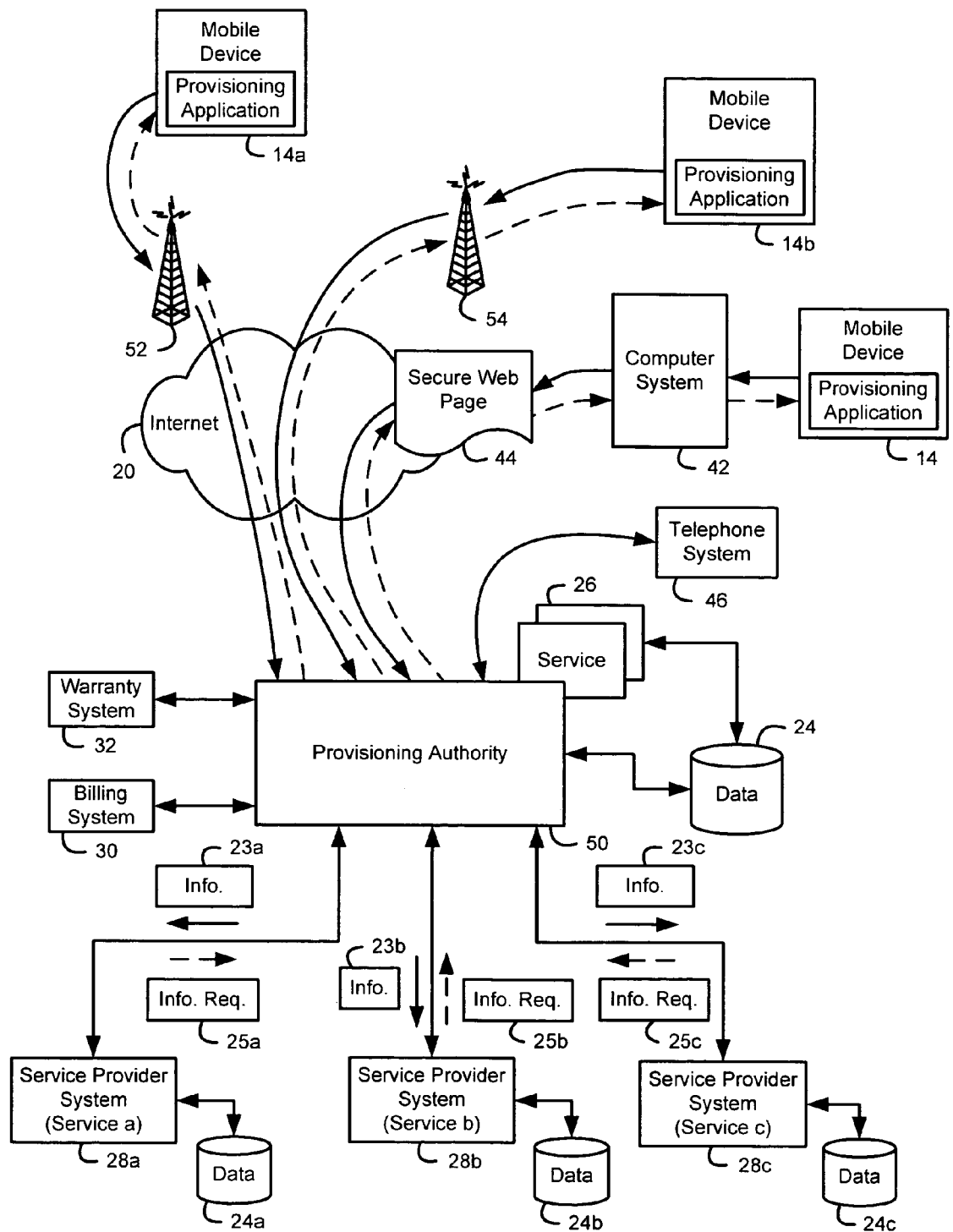
FIG. 5 is a block diagram showing a variation of the provisioning system of FIG. 4.

It is apparent from the description above that different provisioning schemes may be preferred or required for different devices and different networks. In accordance with a further aspect of the present invention, a provisioning authority manages service provisioning for multiple networks and mobile devices. FIG. 5 is a block diagram showing a variation of the provisioning system of FIG. 4, in which a single provisioning authority 50 manages service provisioning for networks 52, 54 and devices 14*a*, 14*b*. In FIG. 5, service a, associated with service provider system 28*a*, is a network communication service provided by a carrier for network 52 and service b, associated with service provider system 28*b*, is a network communication service provided by a carrier for network 54.

The provisioning authority 50 is substantially the same as provisioning authority 22 and 21, but is capable of communication over more than one wireless network. Such multiple-network communication functionality may be facilitated by different communication modules in the provisioning authority 50, but is preferably provided in the gateways (not shown) through which the wireless networks 52 and 54 connect with the Internet 20. Such gateways normally communicate with other systems, such as the provisioning authority 50, over the Internet 20 using Transmission Control Protocol over Internet Protocol (TCP/IP). The gateways perform any required information format and protocol conversions to enable communication with the mobile devices 14*a* and 14*b* over the respective networks 52 and 54. These gateways may instead be incorporated into a single gateway which implements an IP interface for communication over the Internet 20 and wireless network interfaces for communication with mobile devices 14*a* and 14*b* over the networks 52 and 54.

The mobile devices 14*a* and 14*b* may be either similar devices adapted for operation on the different networks 52 and 54 or entirely different mobile devices. However, it is preferred that a provisioning application is resident on at least one of the mobile devices 14*a*, 14*b*. In FIG. 5, the provisioning application for the provisioning authority 50 is installed on each mobile device 14*a* and 14*b*. For the sole purpose of illustration, it is assumed that the carrier for network 52 requires that the mobile device 14*a* be activated on the network 52 before any network communications will be permitted, whereas the mobile device 14*b* is configured with restricted initial communications functionality as described above, such that the carrier for network 54 allows the mobile device 14*b* to communicate with the provisioning authority 50 to perform initial service provisioning or activation.

A user of the device 14*a*, intended to operate on the network 52, must therefore initially provision network services from the service provider system 28*a* through the secure web page 44, the telephone system 46, or possibly through another alternate provisioning interface (not shown), if available. Once the mobile device 14*a* is activated on the network 52, the provisioning application may be executed to perform further provisioning functions using only the device 14*a*. Although an alternate provisioning interface must be used for initial provisioning or activation of the mobile device 14*a* on the network 52, a user of the mobile device 14*b* may use the provisioning application and the mobile device 14*b* itself to accomplish mobile device activation through the provisioning authority 50. As will be apparent, any alternate provisioning interface may instead be used when desired or required, such as when the mobile device 14*b* is out of coverage of the network 52, for example. A user of mobile device 14*b* has a choice of self-provisioning or alternate provisioning for activation of the mobile device 14*b*.

The single provisioning authority 50 thereby independently manages provisioning functions for multiple devices, networks and service providers. Any provisioning scheme restrictions related to one mobile device, network, or service provider associated with the provisioning authority 50 have no effect on provisioning functions of other mobile devices, networks or service providers associated with the provisioning authority 50.

Figure 6:
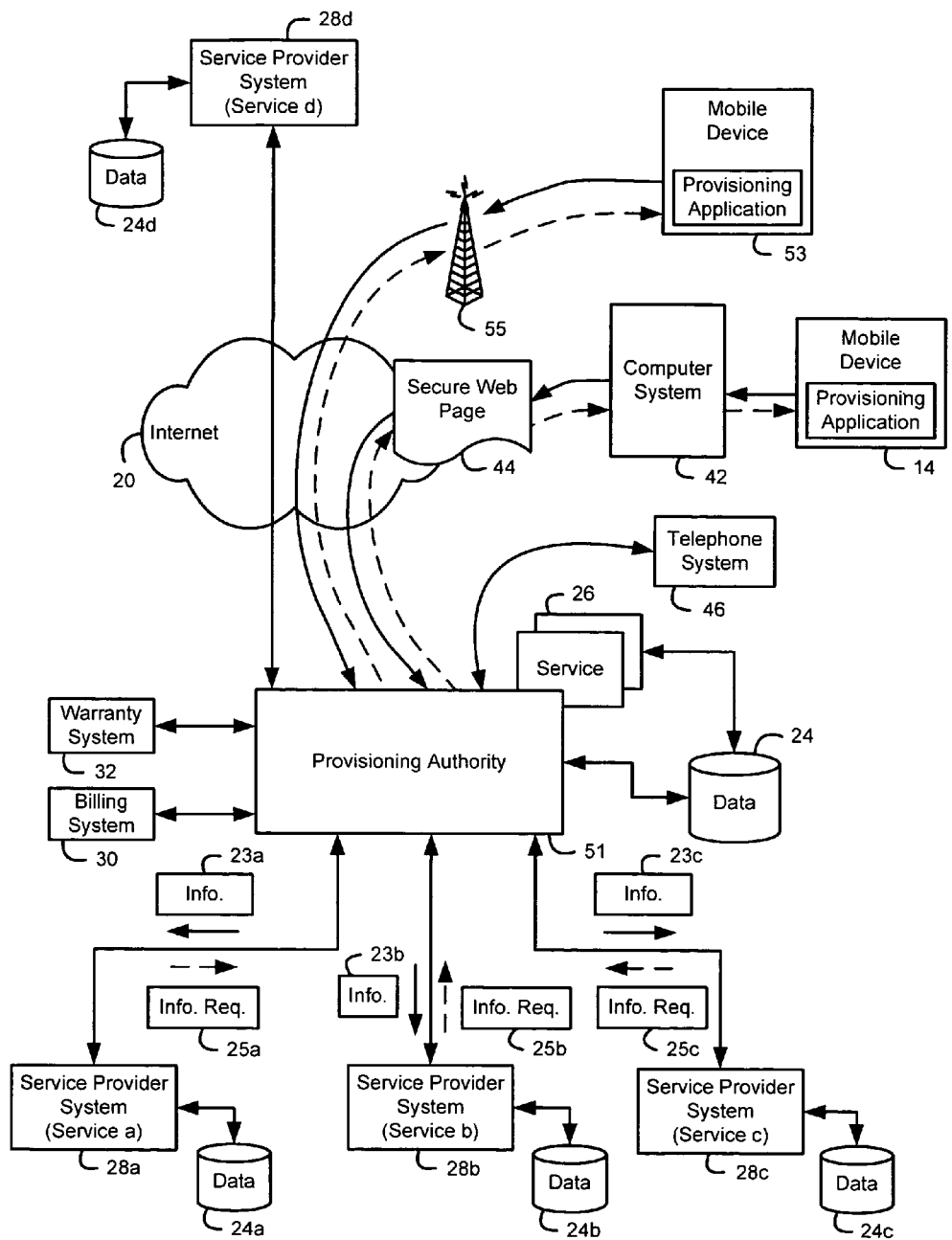
FIG. 6 is a block diagram showing a provisioning system according to another embodiment of the invention.

FIG. 6 is a block diagram showing a provisioning system according to another embodiment of the invention. The system of FIG. 6 is substantially the same as the system shown in FIG. 4 and operates substantially as described above, but includes a service provider system 28*d*, which communicates with the provisioning authority 51 via the Internet 20. Alternatively, the service provider system 28*d* may communicate with the provisioning authority 51 through a network other than the Internet 20, such as a local or wide area network. Information and requests are exchanged between the service provider system 28*d* and the provisioning server 51, as described above, through the Internet 20. Other communication schemes and arrangements providing for communications between the provisioning authority 51 and the service provider system 28*d* will be apparent to those skilled in the art. Although the particular form of communications between the provisioning authority 51 and service provider systems may vary, the overall provisioning scheme is preferably substantially as described above.

The provisioning authority 51 supports more than one type of communication interface to service provider systems. In FIG. 6, the internal services 26 may use an internal computer interface and protocol for communications with the provisioning authority 51, service provider systems 28*a*, 28*b* and 28*c* may be associated with local service providers in the vicinity of the provisioning authority 51 and be configured for communication with the provisioning authority 51 via specific local interfaces or protocols, whereas a remote service provider system 28*d* is configured for a further communications interface and protocol. Those skilled in the art will appreciate that many different combinations of provisioning authority to service provider interfaces, including interfaces not shown in FIG. 6, are possible in accordance with this aspect of the invention.

The provisioning authority 51, as described above, exchanges different information with different systems. For example, the provisioning authority 51 may provide different information to different service provider systems. In a further extension of this feature, the provisioning authority 51 may exchange information with a particular service provider system while executing a provisioning process for a different service provider. This facilitates not only multi-tasking or simultaneous execution of multiple provisioning processes for different independent services possibly for different users, but also provisioning of related services from different service providers for the same user. Those skilled in the art will be familiar with the concept of multi-tasking. The latter related-service provisioning scheme will be described in further detail below.

This aspect of the invention is particularly applicable where one service provider offers services related to a service provided by a different service provider. In a particular preferred embodiment, a service provider system such as 28*d* is associated with a service provider d that provides messaging services, such as email services. A service provider c which owns or operates another service provider system, 28*c* for example, and provides some type of enhanced email service to users of its own email service, may wish to extend its customer base by offering the enhanced service to users of other external email services such as those provided by the service provider d. Enhanced email service includes, but is in no way limited to, redirecting received email messages from an email system to the mobile device 53 over the communication network 55. In this embodiment, the mobile device 53 is a wireless communication device capable of at least sending and receiving email. In order to complete a provisioning process for such an extension of enhanced services, the provisioning authority 51 communicates with both service provider systems, 28*c* and 28*d*.

In the above example where the service provider c offers an email redirection service, a mobile device user may wish to provision the service for an existing email account associated with the service provider d. The user may invoke the provisioning application on the mobile device 55 or contact the provisioning authority 51 through one of the alternate provisioning interfaces, secure web page 44 or telephone system 46, as described above. The overall provisioning process proceeds substantially as described above and shown in FIG. 3, but involves additional processing between the provisioning authority 51 and the external service provider system 28*d*.

Figure 7:
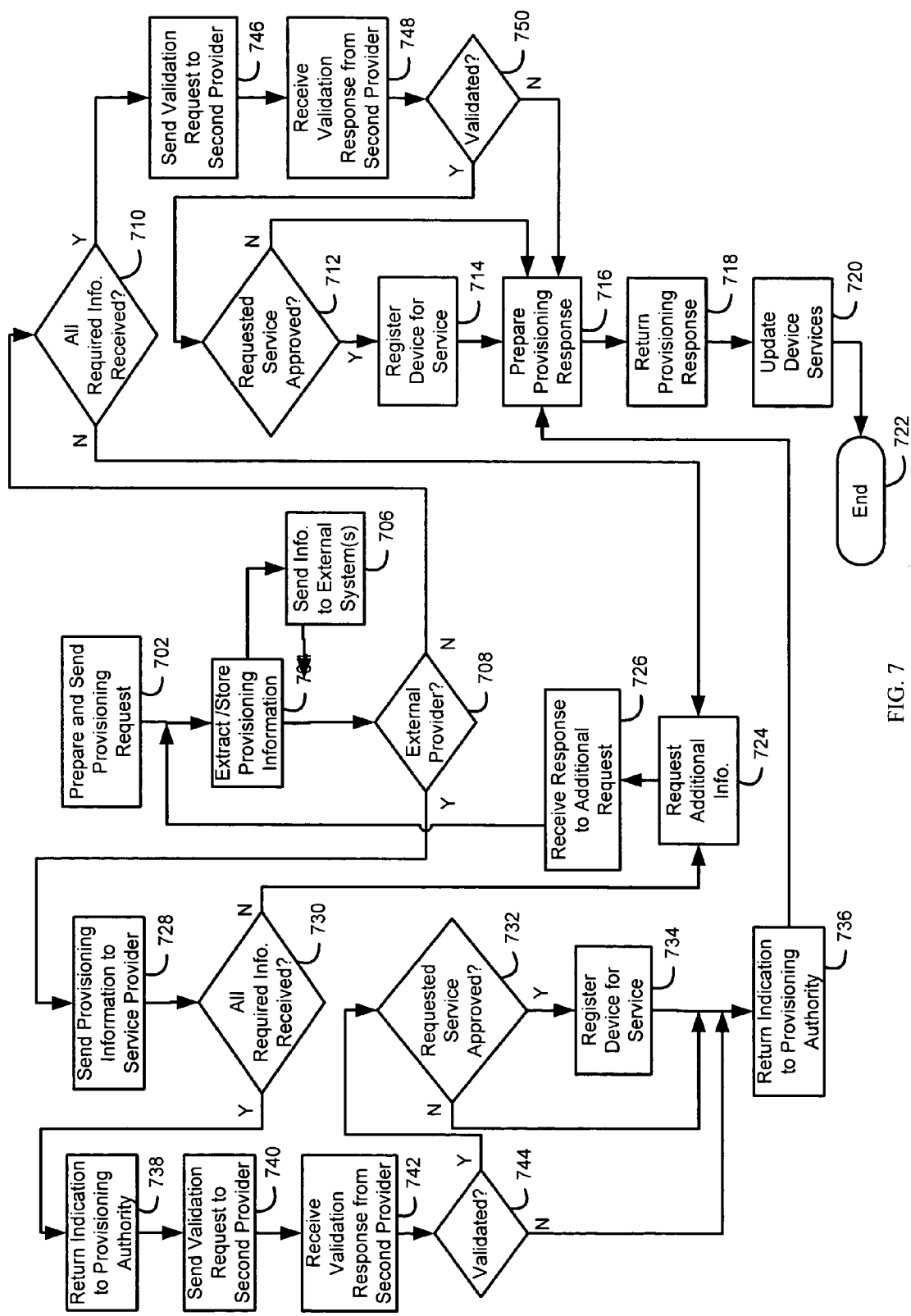
FIG. 7 is a flow diagram of a provisioning process for a service which is related to a further service.

FIG. 7 is a flow diagram of a provisioning process for a service which is related to a further service. The steps 738 through 744 and 746 through 750 are performed by the provisioning authority 51 during processing of a provisioning request for a service offered by a first service provider that is related to a different service offered by a second service provider. The remaining steps in the provisioning process are substantially the same as similarly labelled steps in FIG. 3 and have been described above. These steps therefore will be described further only to the extent necessary to illustrate related-service provisioning.

At step 702, a provisioning request is prepared and submitted to the provisioning authority. As described above, information for the provisioning request is preferably retrieved from the mobile device or requested from a user. Although it is preferred that the provisioning request is prepared on and sent from a mobile device, any of the alternate provisioning interfaces shown in FIG. 6 may instead be used. The provisioning process then proceeds as described above to extract and store provisioning information (step 704), send pertinent information to such systems as billing and warranty systems (step 706), and determine whether the first service provider offering the requested service is external to the provisioning authority (step 708). The first service provider then checks to ensure that all required information has been received, at step 710 if the first service provider is internal, and at step 730, after the provisioning information has been sent to the service provider system at step 728 where the service provider is external. Any missing information is then requested if necessary at step 724. As described above, device provisioning applications are preferably kept current, such that all required information is provided in a provisioning request.

Depending upon the nature of missing provisioning information, the first service provider may continue to process the request for service, as described above. When the required information has been received at step 726, or the first service provider determines that the service request processing should continue without certain information, then an indication to that effect is preferably sent to the provisioning authority at step 738, if the first service provider is an external service provider. Since the enhanced service offered by the first service provider, an email redirection service in the above example, is dependent upon the related service (an email account) offered by the second service provider, then the provisioning authority or first service provider must at least verify that the user submitting the provisioning request for the enhanced service has previously provisioned the related service.

In FIG. 7, the first service provider attempts to verify the related service before the request for its enhanced service is processed. However, these processes may be performed in a different order, according to the preferences of the particular first and/or second service providers involved in the related-service provisioning request, or by the provisioning authority as independent processes. For example, the first service provider may wish to verify user billing information or mobile device information before attempting to verify or validate the related service. The second service provider may also establish preliminary checks that must be performed by the first service provider or provisioning authority before a validation request will be processed. These or other checks, including those involved in approving or denying the requested service, may also be performed simultaneously. The first service provider may, for example, perform some of its associated service approval checks while a related service validation request is pending or outstanding to the second service provider. The particular order and type of checks performed may be determined by the provisioning authority, the first service provider, the second service provider, or some combination thereof. These and similar request processing criteria may also be specified in a service provider profile at the provisioning authority.

Related-service validation begins at step 740 for an external service provider or step 746 for an internal service, in which the provisioning authority sends a related-service validation request to the second service provider. The validation request includes information required by the second service provider to authorize access to its user or service records. This information may include, for example, a user name or identifier, an account name or number for the related service and an authorization code such as a password, and is preferably provided by the user in the related-service provisioning request or in response to further information requests from the first service provider or the provisioning authority. Although not shown in FIG. 7, the second service provider may be able to request from the user, the provisioning authority, or the first service provider, any required information that was not provided in the validation request. This additional information request may be submitted substantially as described above and illustrated in steps 724 and 726, with the response information being provided to the second service provider.

When a related-service validation response is received at step 742 or step 748, it is determined whether the related service was validated by the second service provider, at step 744 or step 750. This determination is preferably made at the first service provider system when the requested service is provided by an external service provider or by the provisioning authority when the service is provided by an internal service provider which owns or operates the provisioning authority. If the related service was validated, then processing continues at step 732 or step 712, wherein the first service provider determines whether access to the requested service should be granted. If the first service provider approves the service request, then the mobile device is registered for service at step 714 or step 734. If the first service provider is an external provider, then an appropriate indication is returned to the provisioning authority at step 736. A provisioning response is then prepared (step 716) and sent (step 718) to the mobile device or alternate provisioning interface that was used to submit the original related-service provisioning request, and the mobile device services are updated accordingly at step 720, as described above. The provisioning process is then complete, and ends at 722.

If the second service provider does not validate the related service, then access to the requested service is denied, an appropriate indication is returned to the provisioning authority at step 736 if the first service provider is an external service provider, and a provisioning response is prepared and returned to the mobile device at steps 716 and 718. A denial of service by the first service provider is similarly communicated to the user, through an indication to the provisioning authority if necessary and a provisioning response.

The first and second service providers may also provide a conditional service approval or related-service validation. For example, the second service provider may indicate in a validation response that a user account is not in good standing, but may be returned to good standing provided that the user takes some action to restore the account. Access to the requested service may then be granted to the user, conditional upon the user restoring the account to good standing. If the first service provider determines that access to the requested service should be denied, for example where an invalid related-service account number, an incorrect related-service account password, invalid billing information or the like has been provided by the user, full access to the service could be made conditional upon the user supplying correct information and subsequent verification of the information by the first and/or second service providers. In a similar manner, where the second service provider does not validate the related service, the first service provider may submit an additional information request to the user through the provisioning authority to request correct or valid information and submit a new validation request to the second service provider when the additional information is received. As described above, the number times the first or second service provider requests additional information from the user is preferably limited.

In the above example of an email redirection service offered by the first service provider for existing email accounts provided by the second service provider, registration of a mobile device for redirection services at step 714 or step 734 involves not only a registration process to register the user's mobile device on the first service provider's system, but also some sort of registration process at the second service provider. In a preferred embodiment of the invention, setup of the user's email account for redirection service is performed in conjunction with the validation by the second service provider. Basic email forwarding information, including at least a forwarding address, associated with the first service provider, to which new messages arriving at the user's email system or indications that new messages have arrived at the user's email system should be sent, are provided to the second service provider as part of the validation request. The forwarding information may instead be sent to the second service provider when the user's account has been validated, as determined at step 744 or step 750, or when the provisioning request has been approved at step 712 or step 732.

In a particularly preferred embodiment, the provisioning authority sends an encrypted validation request, in the form of an email message encrypted using Pretty Good Privacy™

(PGP™) or Secure Multipurpose Internet Mail Extensions (S/MIME), for example, to the second service provider. This message includes at least an email account identifier and an email account password supplied by the user and email forwarding information for the first service provider system. A validation response from the second provider then preferably includes not only a validation of the email account information, but also a confirmation that the email forwarding has been successfully enabled. Redirection of email from the first service provider system to the mobile device may then be configured at both the first service provider system and the mobile device.

Figure 8:
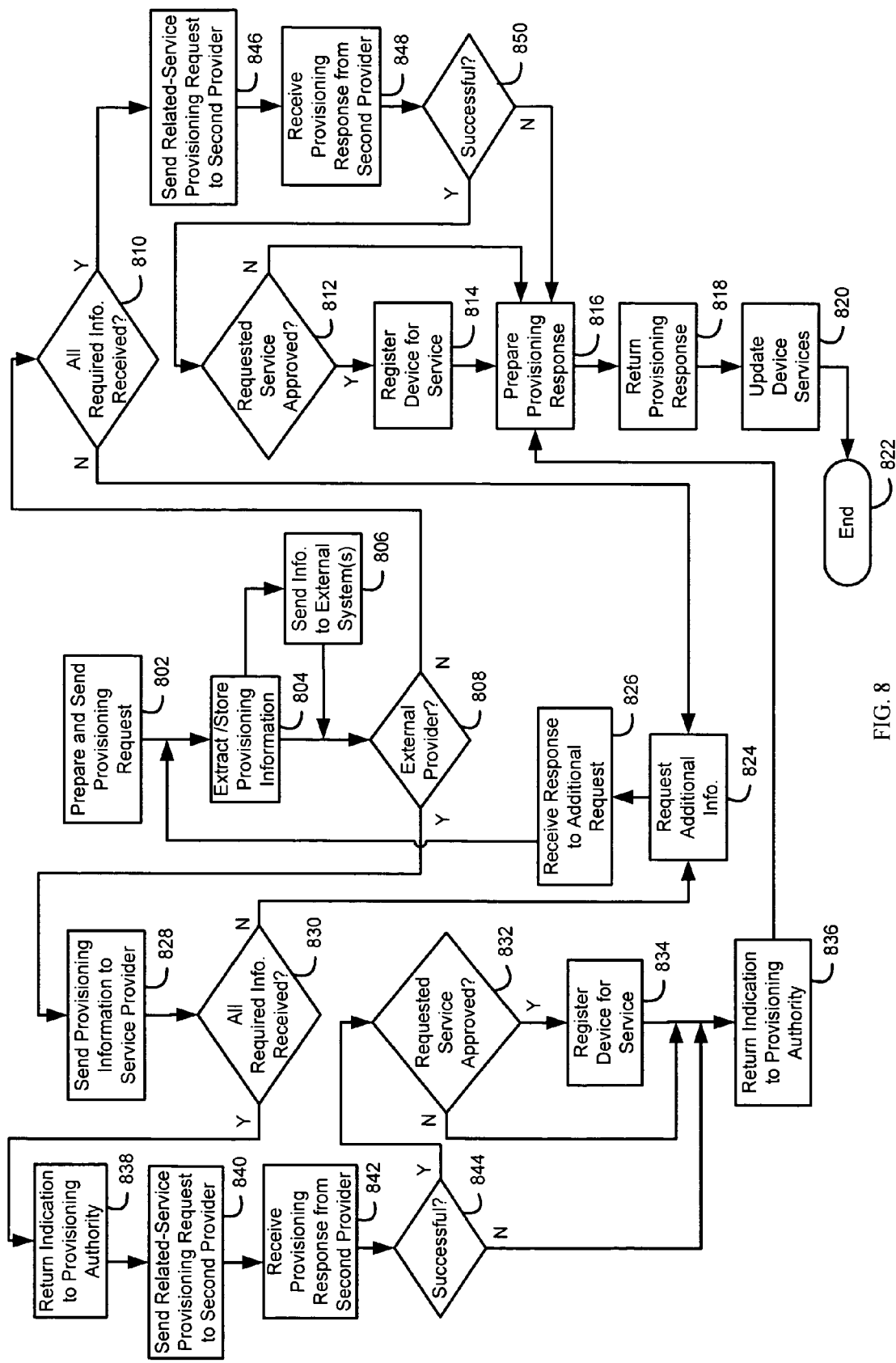
FIG. 8 is a flow diagram illustrating a variation of the provisioning process of FIG. 7, in which both a service and a related service are requested.

The provisioning process shown in FIG. 7 assumes that the user wishes to provision a service from a first service provider that is related to an existing service from a second service provider. According to a further aspect of the invention, a first service and a related second service are provisioned via a single provisioning request. FIG. 8 is a flow diagram illustrating a variation of the provisioning process of FIG. 7, in which both a service and a related service are requested. For illustrative purposes, the above example of an email redirection service offered by a first service provider for an email account hosted by a second service provider will be used.

The provisioning process shown in FIG. 8 is substantially the same as the provisioning process of FIG. 7, except that the first service provider provisions the related service instead of validating the related service. In this respect, the provisioning request prepared and sent at step 802 differs from the provisioning request prepared and sent at step 702. For example, where a new email account is to be provisioned as the related service offered by the second service provider, the provisioning request includes at least a preferred user name and password, and any billing information as may be required by the second service provider. Steps 802 through 838 are otherwise substantially the same as similarly labelled steps in FIG. 7. Steps 840 through 850, by which the process in FIG. 8 differs from the process in FIG. 7, are described in further detail below.

When required provisioning information has been received or the first service provider determines that the service request processing should continue without certain information, as determined at step 810 or 830, then an indication to that effect is preferably sent to the provisioning authority at step 838 if the first service provider is an external provider. Where the first service provider is internal to the provisioning authority system, it should be apparent that no such indication need be sent to the provisioning authority.

The provisioning authority then attempts to provision the related service, a new email account, from the second service provider before the request for the service, an enhanced email service in this example, is processed. However, as above, these processes may be performed in a different order, according to the preferences of the particular first and/or second service providers, or possibly simultaneously. For example, the first service provider or provisioning authority may first verify user billing information or mobile device information before the service and/or related service are provisioned. The first service provider may instead perform some of its associated service approval checks while a related service provisioning request is outstanding from the provisioning authority. The particular order and type of checks performed may be determined by the provisioning authority, the first service provider, the second service provider, or some combination thereof.

Related-service provisioning, in this example email account provisioning, is initiated by sending the related-service provisioning request to the second service provider at step 840 or step 846. The related-service provisioning request may be in the form of an encrypted email message to the second service provider as described above, and includes any information required by the second service provider to process the related-service provisioning request. This information may include, for example, a preferred user name and password and billing information required by the second service provider, which was provided by the user in the original multiple-service provisioning request. The second service provider is also preferably able to request from the user, the provisioning authority, or the first service provider, any required information that was not provided in the related-service provisioning request, substantially as described above and illustrated in steps 824 and 826, with the response information being provided to the second service provider.

When a related-service provisioning response is received at step 842 or step 848, the first service provider or provisioning authority determines whether the related service was successfully provisioned, at step 844 or step 850. The first service provider continues its processing at step 812 or step 832, to determine whether access to the requested service should be granted, where the related service was successfully provisioned. The process continues at step 834 or step 814, substantially as described above.

If the second service provider denies the related-service provisioning request, as determined at step 844 or step 848, then access to the requested service may be denied, an appropriate indication is returned to the provisioning authority (step 836) if the first service provider is an external service provider, and a provisioning response is prepared and returned to the user at steps 816 and 818. A denial of service by the first service provider following successful provisioning of the related service is similarly communicated to the user, through an indication to the provisioning authority if necessary, and a provisioning response. The user is preferably able to specify, either in the original multiple-service provisioning request or a further message sent to the provisioning authority in response to the provisioning response, any actions to be taken if provisioning of only one or the other of the requested service and the related service is successful. For example, the user may wish to maintain a new email account even if the request for email redirection service is denied. The user might instead prefer that the new related service be cancelled if access to the requested service is denied.

The first and second service providers may also provide a conditional service approval or related-service validation. For example, the second service provider may indicate in the related-service provisioning response that the preferred user name is already used in its email system or that the preferred password does not conform to its length or other formatting requirements, such that an email account could not be established. Access to the requested service may then be granted to the user by the first service provider, conditional upon the user establishing an email account and providing any information required by the email account provider to allow email forwarding rules to be configured on the account. When such information is provided by the user, the first service provider need only validate the existing account as described above in conjunction with FIG. 7. Alternatively, in response to such user name or password problems, the first or second service provider may send an additional information request to the user to prompt the user to select and submit a different user name and/or password. The second service provider then preferably re-executes its processing of the related-service provisioning request with the new information from the user. As above, if the provisioning application remains current with any changes in service provider requirements, such properties as password formatting requirements may be checked at the mobile device (or web interface, if used for provisioning) before a provisioning request is submitted.

Where invalid billing information or the like has been provided by the user, full access to one or both of the service and the related service could be made conditional upon the user supplying correct information and subsequent verification of the information by the first and/or second service provider. As described above, the number times the first or second service provider requests additional information from the user is preferably limited.

Although FIGS. 7 and 8 show separate provisioning processes, dependent upon whether or not the related service exists or must also be provisioned, a hybrid type of provisioning process, wherein the provisioning authority or first service provider determines whether the related service must be provisioned or merely validated, is also contemplated. Such a hybrid process includes a step to make this determination and proceed to either validate (steps S702 through S708a or S708b) or provision (steps S802 through S808a or S808b) the related service.

Figure 9A:
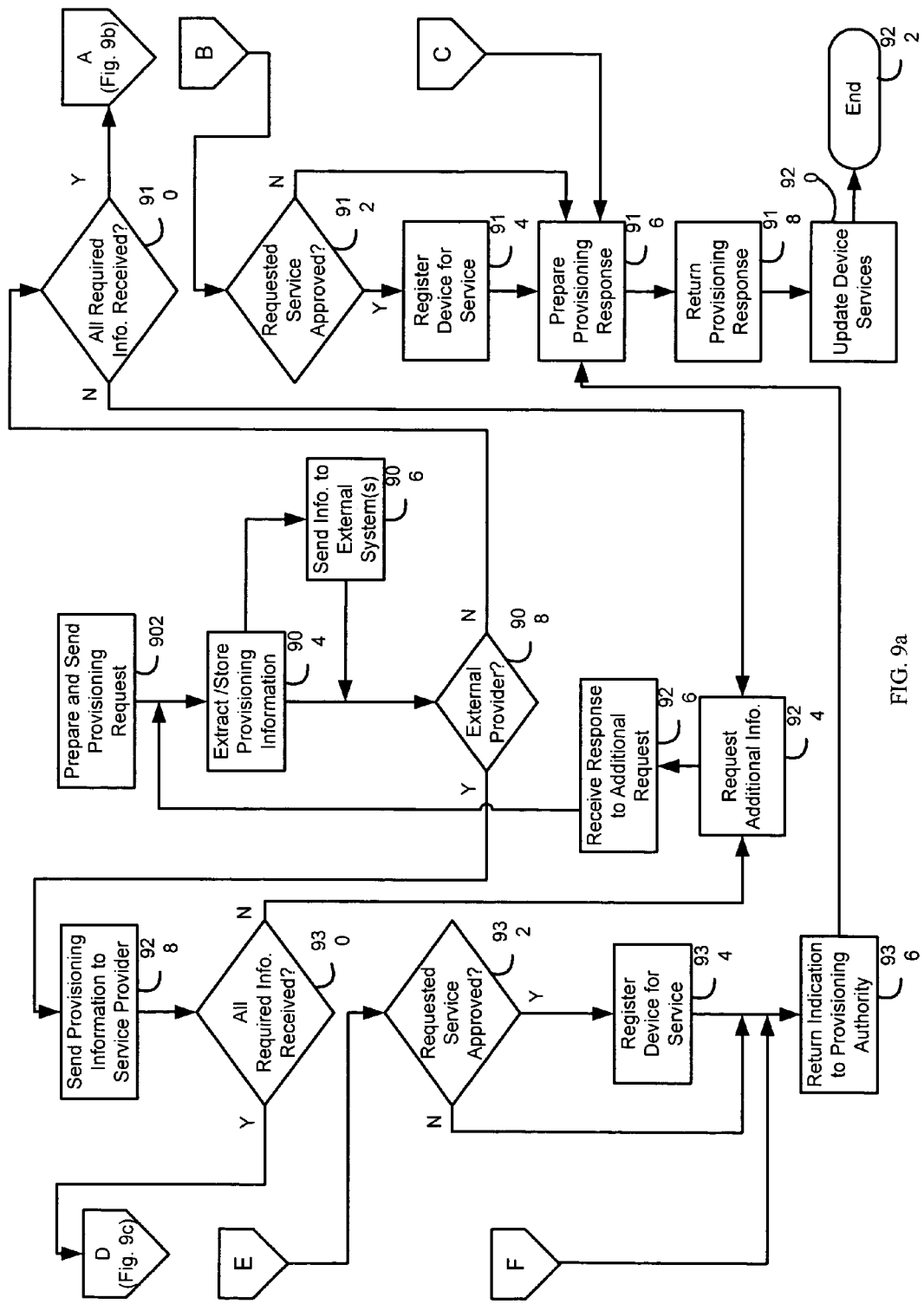
FIGS. 9a-9c form a flow diagram illustrating a further variation of the provisioning processes shown in FIGS. 7 and 8.
Figure 9B:
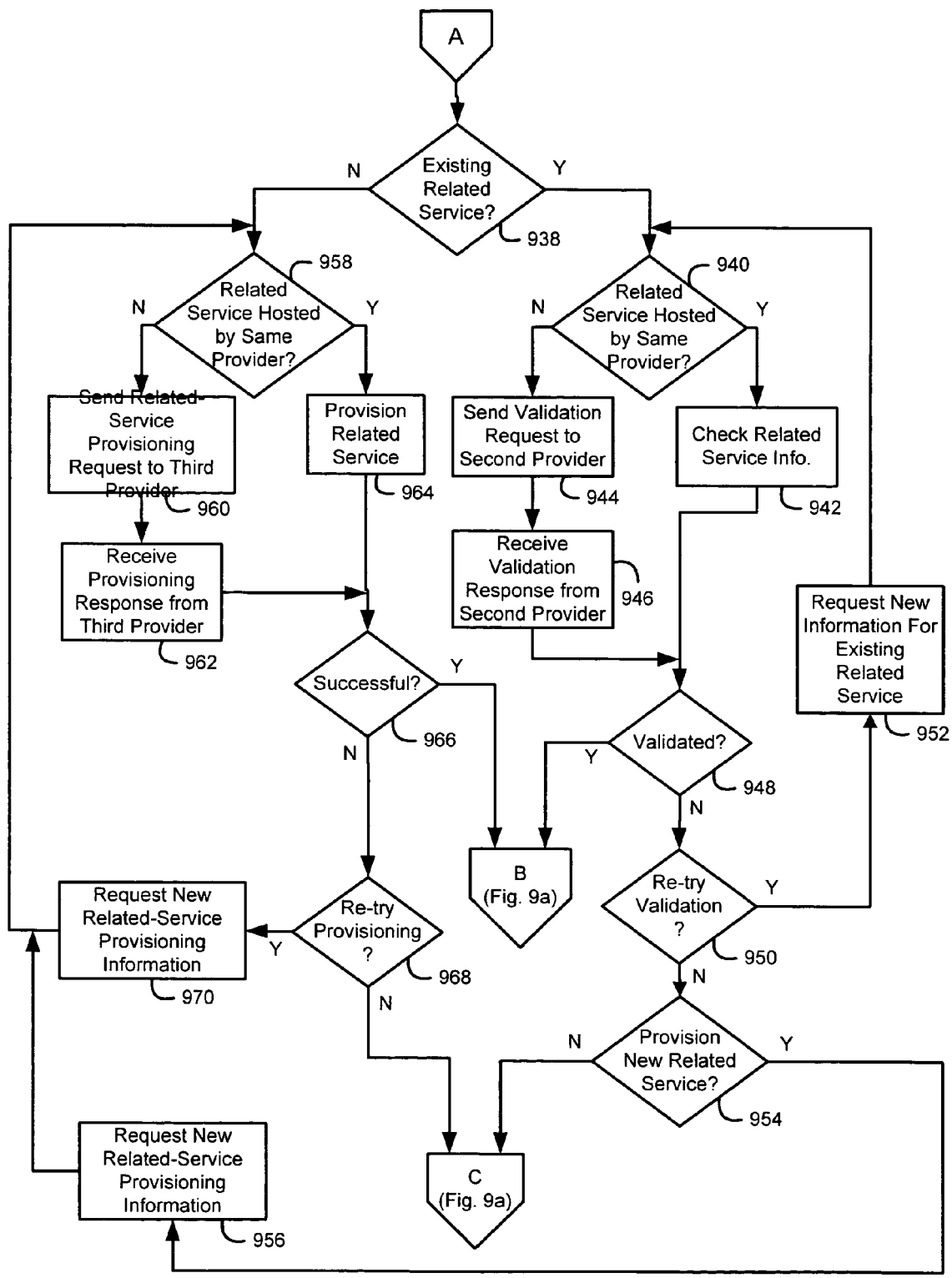
Figure 9C:
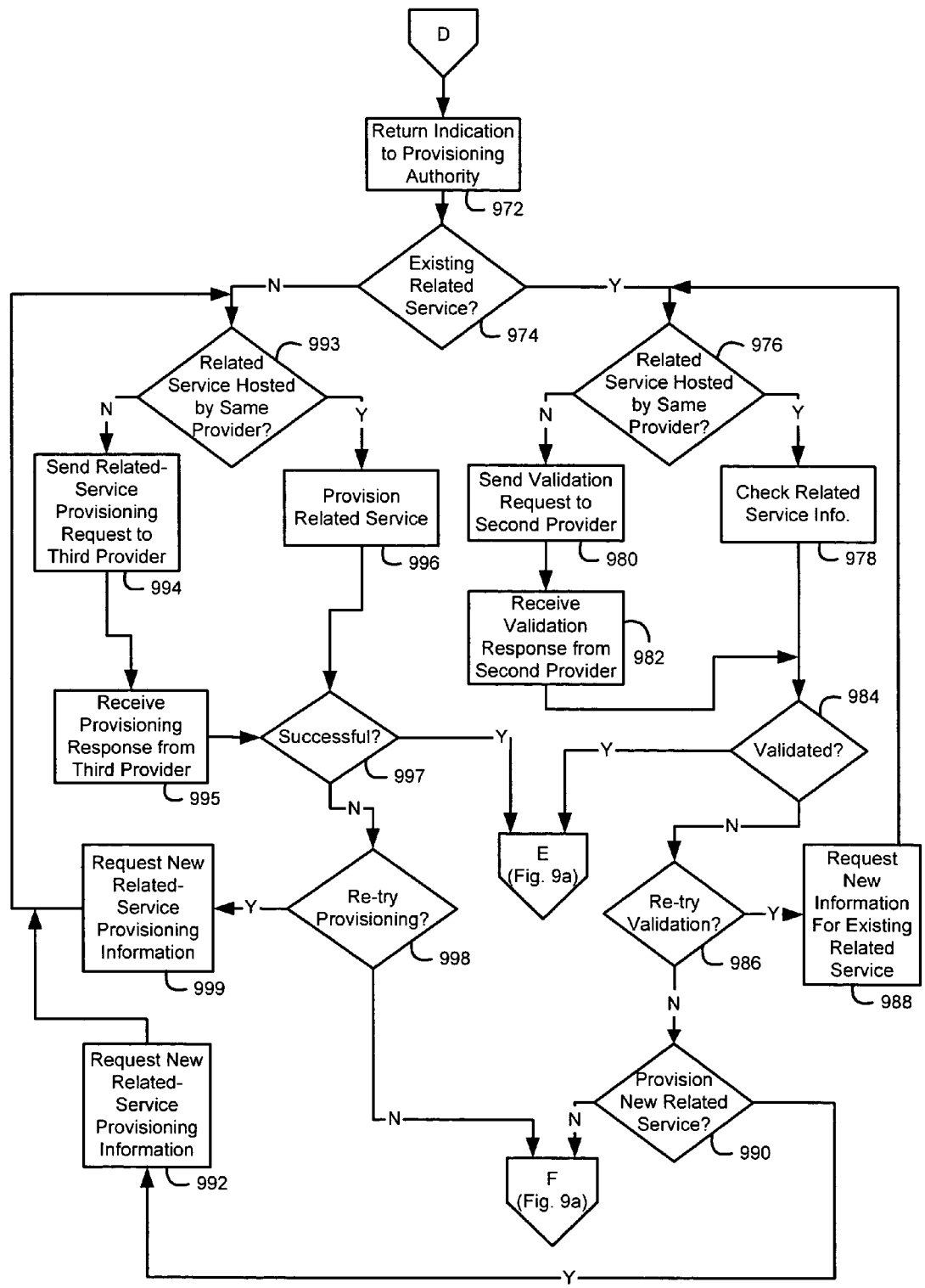

FIGS. 9a-9c form a flow diagram illustrating a further variation of the provisioning processes shown in FIGS. 7 and 8. The related-service and multiple-service provisioning process in FIGS. 9a-9c includes both validation and provisioning steps for the related service, in which a mobile device user has the option of using a related service offered by either the first service provider or a second service provider. Continuing with the above example of an email redirection service and a related email service, in this embodiment of the invention, the first service provider hosts not only the redirection service but also email services.

The process steps 902 through 936 are substantially the same as similarly labelled steps in FIGS. 7 and 8, although the provisioning requests and responses used in the process of FIGS. 9a-9c may include different provisioning information.

A provisioning request is prepared and sent to a provisioning authority at step 902. The provisioning process proceeds to execute the operations in steps 904 through 908 as described above. The first service provider then checks to ensure that all required information has been received, at step 910 or step 930 and requests any missing information if necessary at step 924.

When the first service provider is an internal service provider associated with the provisioning authority and all required information has been received or the first service provider determines that the service request processing should continue without certain information, at step 910, then the provisioning process proceeds as shown in FIG. 9b.

At step 938, it is determined whether the related service is an existing service, i.e., whether the user has an email account with which the email redirection service is to be established. If so, then the first service provider preferably determines whether the related service is hosted by a second service provider at step 904, for example by checking the domain name associated with email account information provided by the user in the provisioning request. Where the existing service is hosted by the first service provider, the first service provider checks the related service information to validate the user's related service, at step 942. Where the related service is provided by a second service provider, then a validation request is sent to the second provider at step 944. The internal validation result from step 942 or the validation response received from the second provider at step 946 is then analyzed to determine whether the related service was validated by the associated first or second service provider, at step 948.

Where the related service is validated, the provisioning process continues at step 912 (FIG. 9a). The user is either approved or denied access to the requested service via steps 912 through 922 substantially as described above.

Although described only briefly above, FIG. 9b shows exception or error processing steps executed when an existing related service is not validated. At step 950, the first service provider determines whether validation of the existing related service should be re-tried. For example, the provisioning authority, first service provider or second service provider may automatically re-try validation a specific number of times after a first validation failure, or upon other conditions being satisfied. The first or second service provider or the provisioning authority may then request that the user re-enter some or all related-service information at step 952 before re-trying the validation. Where a validation response indicates an incorrect related-service password for example, the user may be prompted to re-enter the password.

Where the validation fails and will not be re-tried, then the user may be given the option of provisioning a new related service 954. This allows the user to provision a new email account if the existing account information provided in the provisioning request or during the provisioning process cannot be validated. When the user chooses to provision a new related service, new related-service provisioning information, possibly including a preferred service provider, user name, password, billing information and any further information as may be required by the specified service provider, is requested from the user at step 956. The first service provider then attempts to provision a new email account on behalf of the user, as will be described in further detail below. When related-service validation has failed and will not be re-tried, and the user does not wish to provision a new related service, processing continues at step 916, as described above.

If the user does not yet subscribe to a related service or has chosen to provision a new related service, the first service provider determines, at step 958, whether the requested new related service is hosted by the first service provider or a third service provider. Those skilled in the art will appreciate that when the new related service is being provisioned after a related service validation failure, the third service provider may be the second service provider or a further different service provider. Where the requested related service is hosted by a third service provider, then a related-service provisioning request is sent to the third service provider at step 960 for processing. A related-service provisioning response is then returned to the provisioning authority or the first service provider, as indicated at step 962. If the requested related service is hosted by the first service provider, the first service provider processes the related service request at step 964. Where both the service and the related service are to be provisioned from the first service provider, the step 964 may instead be incorporated into step 912, such that processing continues at step 912 following an affirmative determination at step 958.

At step 966, the first service provider or provisioning authority determines whether the related service was successfully provisioned. Where the related service was successfully provisioned, the first service provider continues its processing at step 912 to determine whether access to the requested service should be granted. The process then concludes at steps 914 through 922 as described above.

When the related-service provisioning is unsuccessful, the first service provider may re-try to provision the related service, at step 968. Similar to the validation re-try described above, the provisioning authority, the first service provider or the third service provider may attempt to provision the related service a predetermined number of times or upon certain conditions being satisfied. The user might instead be prompted to select whether or not related-service provisioning should be re-tried. If provisioning of the related service was unsuccessful and is not retried, the provisioning process continues at step 916, and an appropriate provisioning response is prepared and returned to the mobile device at step 918.

When related-service provisioning is to be re-tried, the user is prompted to enter some or all of the provisioning information, at step 970. For example, if the requested related service was denied because a preferred user name is already in use, then the user might be prompted for either a new user name or a different service provider prior to re-trying the related-service provisioning. In this example, if the unsuccessful related-service provisioning was executed for a third service provider, the first service provider may also indicate to the user whether the preferred user name is currently available on its system or check with one or more other service providers to determine if the user name is available on their respective systems and indicate which service providers may be able to provide the related service with the preferred user name. Similarly, alternate available user names on the third service provider system or a system of another service provider may be suggested to the user. The user may then choose to re-try related-service provisioning with the same service provider or a different service provider. By selecting one of the suggested user names or service providers, the user increases the likelihood of successfully provisioning the related service.

Upon successful provisioning of the related service, the process proceeds with the service provisioning step 912 and 914 if appropriate. A provisioning response is then prepared at step 916 and returned to the user at step 918, device services are updated at step 920 and the process ends at step 922. If the related service cannot be successfully provisioned and will not be retried, processing proceeds to step 926 and concludes with steps 918 through 922.

FIG. 9c shows a similar process for an external service provider. The provisioning process for an external service provider is substantially the same as that for an "internal" service provider associated with the provisioning authority system and thus only the differences between these processes will be described in detail.

At step 972, the external service provider returns an indication to the provisioning authority that provisioning request processing will proceed, either when all required provisioning information is received or the external service provider determines that the provisioning request will be processed in the absence of any missing information. The provisioning process then continues at step 974 and proceeds to validate (steps 976 through 982) or provision (steps 993 through 996) the related service as described above. If the related service is validated (step 984) or successfully provisioned (step 997), then the process proceeds at step 932 to determine whether the user will be granted access to the requested service, the device is registered for service if appropriate (step 934) and an indication of approval or denial of service is returned to the provisioning authority at step 936. The provisioning process then concludes at step 922, following preparation and transmission of a provisioning response (steps 916 and 918) and updating of device services (step 920).

The external provider process may also include related-service validation and provisioning re-try procedures, via steps 986 and 998, respectively. In the event of a related-service validation or provisioning failure, the validation or provisioning may be re-tried, with either the same information or new information requested from the user (step 988 or step 999). When validation will not be re-tried, the user may also be given an option to attempt to provision a new related service, at steps 992 through 999, as described above. If related-service validation or provisioning has failed and will not be re-tried, or validation has failed and provisioning of a new related service will not be attempted, processing continues at step 936 to return an appropriate indication to the provisioning authority and the overall process concludes with steps 916 through 922.

It will be apparent to those skilled in the art that the above operations may be performed in a different order than described and shown in the FIGS. 9a-9c. Also, some of the process steps and associated operations, such as the re-try procedures and the new related-service provisioning after a validation failure, are optional.

The illustrative embodiments of provisioning systems and processes in accordance with aspects of the invention have been described above primarily in the context of subscribing to or adding a new mobile device service. However, other provisioning requests, to delete or modify existing services for example, are also contemplated. The overall provisioning system and processes would be substantially as described above. A delete service or modify service provisioning request would preferably be submitted to a provisioning authority and processed by the provisioning authority and possibly a service provider. When the provisioning request has been processed, a provisioning response is returned to the user, via the mobile device to which the service provisioning request relates or an alternate provisioning interface through which the provisioning request was submitted.

Figure 10:
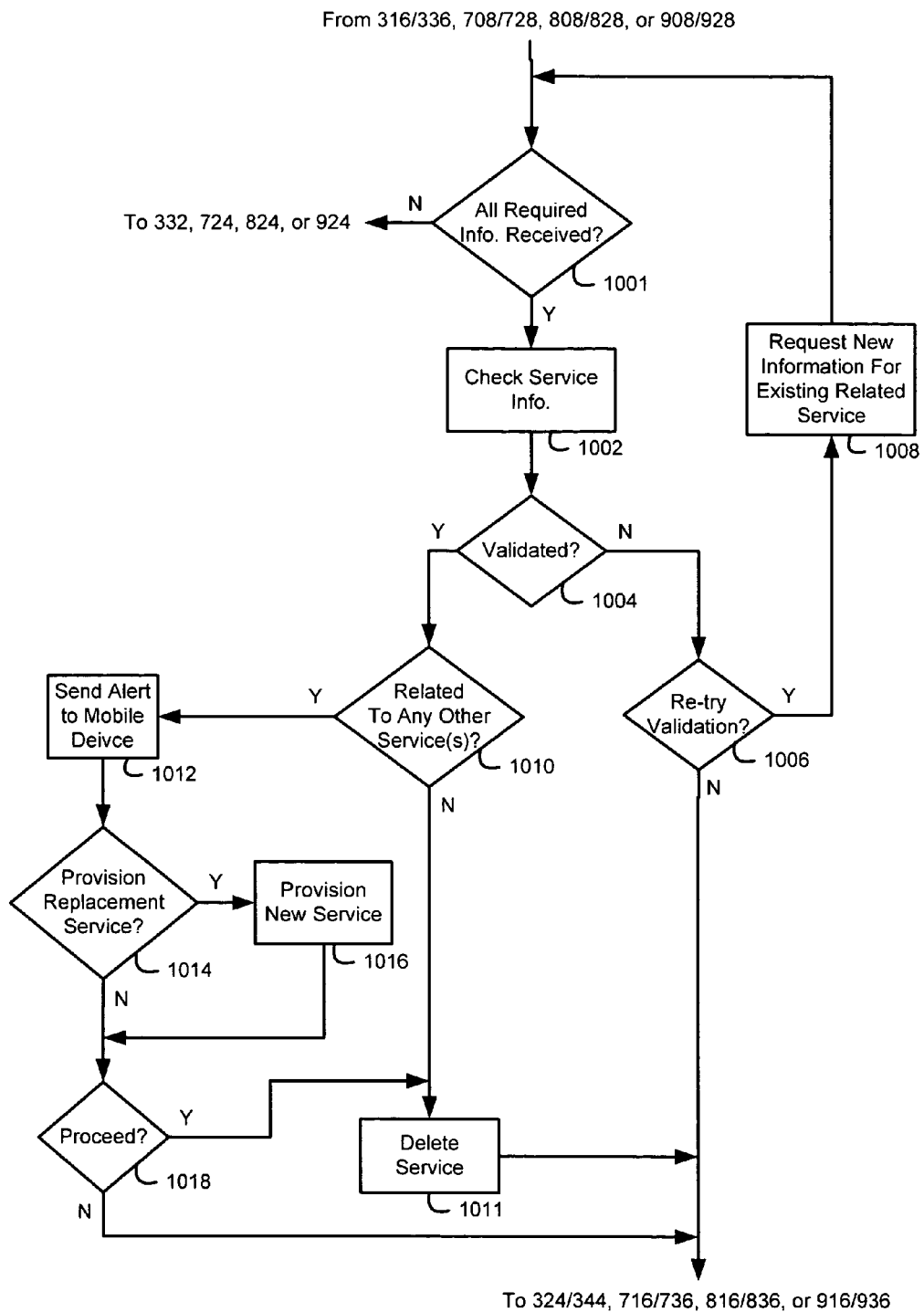
FIG. 10 is a flow diagram showing a delete service provisioning process.

FIG. 10 is a flow diagram showing a delete service provisioning process, which effectively removes a service for a particular mobile device or user. It should be understood that a delete service provisioning request is prepared and sent to the provisioning authority and initial provisioning request processing is substantially as described above. In particular, the process steps which precede the step of determining whether all required provisioning information has been received, as well as the steps following service approval or denial have not been shown in FIG. 10 in order to avoid congestion in the flow diagram.

A provisioning request is prepared using either the mobile device or possibly an alternate provisioning interface and submitted to the provisioning authority, which extracts provisioning information and determines whether the service provider which hosts the service to be deleted is associated with the provisioning authority system or an external service provider. As indicated in FIG. 10, provisioning request preparation and initial processing steps such as 302 through 316 and possibly 336 in FIG. 3 or corresponding steps from FIGS. 7, 8 or 9a, precede step 1001. The service provider or provisioning authority then determines whether all required information has been received or, if not, whether processing should continue in the absence of any missing information, at step 1001, as described above.

The provisioning request preferably has a common format, including, for example, a request type field to indicate the type of provisioning request (add service, delete service, modify service) and information fields. Those skilled in the art will appreciate that different types of requests may include different information. For example, credit card and other billing information may be required in an add service provisioning request but not in a delete service request. Although the specific required information may be different for different types of requests, the checks in step 1001 are preferably performed similarly regardless of the type of request.

When processing of a delete service provisioning request is to continue, the service to be deleted is first validated to verify that the service actually exists. The service information provided by the user is checked at step 1002, and at step 1004, it is determined whether the service was validated. As described above, the validation may be re-tried at step 1006, possibly after new information is provided by the user at step 1008 following a validation failure. If the service cannot be validated and validation will not be re-tried, then processing continues at step 324 or at step 344 (FIG. 3) for an external provider, or at corresponding steps from FIG. 7, 8, or 9*a*. An appropriate provisioning response is prepared and returned, records, menus or lists on the mobile device may be updated to indicate a delete service operation error or failure, and the delete service provisioning process ends. Deletion of a service, similar to add service provision as described above, may be conditional, for example where some further information may be required for completion of processing, the user has a billing amount outstanding, or perhaps some other service or account condition has not been satisfied.

Where the service to be deleted is validated at step 1004, the service provider or the provisioning authority the checks to determine whether the service to be deleted is related to any other mobile device services, at step 1010. This step is preferred to avoid problems with any related services, but is optional. A check may instead be made at the mobile device while a delete service provisioning request is being prepared, before the provisioning request is submitted to the provisioning authority, or after the service has been deleted. Where the service is not related to any other device services, or if the related-service check is not performed, the service is deleted by the service provider at step 1011 and the process continues as described above. A delete service provisioning response confirms that the service has been deleted at the service provider and preferably initiates deletion of the service at the mobile device, by updating device functions, service lists or menus, and possibly deleting applications related to the particular service. Deletion of a service preferably does not prevent the user from subscribing to the service at a later time through a further add service provisioning request.

Where a deleted service is related to another mobile device service, such as in the above example of an email account and an email redirection service, the user must reconfigure the other device service for an alternate related service. Since the provisioning authority preferably manages provisioning of all device services, the provisioning authority may perform the check at step 1010. This related-service check may instead be performed by a service provider, such as the service provider hosting the service to be deleted or the service provider hosting the related service.

If a related mobile device service is found, then the provisioning authority or a service provider sends an alert to the mobile device, at step 1012. Alternatively, the delete service processing may be aborted, and the delete service provisioning response may indicate the reason for delete service failure. When the alert is sent to the mobile device at step 1012, delete service processing preferably stops until a response is received from the user. The user further preferably has the option to specify in the response whether or not a new replacement service with which the related service may be configured to operate should be provisioned before the delete service provisioning processing is completed, as shown at step 1014. If the user chooses to provision a new service to replace the service to be deleted, then the new service is provisioned at step 1016.

The user's response to the alert preferably also indicates whether the delete service process should continue. As shown in FIG. 10, this allows the user to choose to (i) provision a new replacement service at step 1016 and delete the old service at step 1011 when the new service has been successfully added, (ii) not provision a new replacement service but nonetheless delete the existing service at step 1011, or (iii) not provision a new replacement service and abort the delete service process at step 1018. In the latter case, a new service could then be provisioned and configured to operate with the related service and the old service deleted if necessary at a later time. The delete service provisioning process may also be adapted to abort to step 324 or 344 or corresponding steps in FIG. 7, 8 or 9*a* after a predetermined amount of time has elapsed without a response to the alert. As an alternative to steps 1012 through 1018, the delete service process may first be concluded and an add service provisioning process may then be invoked to add a new service to replace the deleted service.

Figure 11:
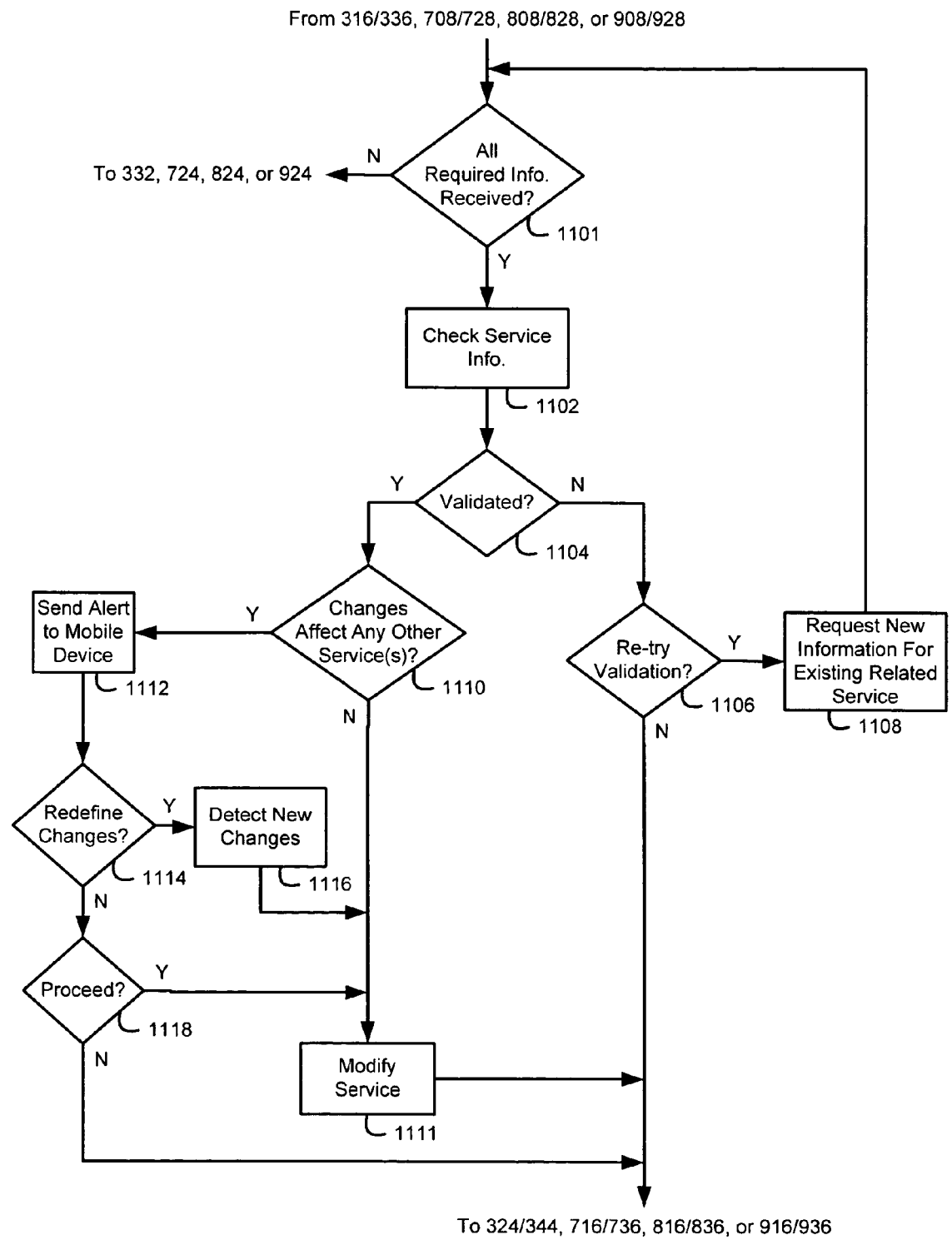
FIG. 11 is a flow diagram showing a modify service provisioning process.

FIG. 11 is a flow diagram showing a modify service provisioning process. A user may wish to modify a service to subscribe to a different service plan for the same service, to add a mobile device to or remove a mobile device from an existing service account, to modify the mobile device registered for a service when a new mobile device is purchased, or to modify a billing address when a user relocates, for example. If the mobile device registered for a service incorporates a SIM card, a modify service provisioning request may also be prepared and submitted whenever the SIM card is to be used in a different mobile device, when a new SIM card is to be used in the mobile device, and other similar situations in which mobile device or user information changes. When a service may be configured according to user-established preferences, the user may submit a modify service provisioning request to initially set preferences or modify existing settings.

A modify service provisioning request is preferably prepared and submitted to a provisioning authority, and initial provisioning request processing is substantially as described above. As in FIG. 10, process steps which precede step 1101 and follow step 1111 have not been shown in FIG. 11, but are common operations that are executed during add service, delete service, modify service and possibly other provisioning processes.

The modify service provisioning request preferably conforms to a common request format as described above, and includes at least a modify service indicator, to specify that the provisioning request is a modify service request, and any required provisioning information. The specific provisioning information required for a modify service request may be different than for other types of requests, but will preferably include at least sufficient information to identify the particular service to which the request relates and authorization information to ensure that the entity submitting the request is authorized to effect changes in the service. The details on information required for a modify service request might also be sent to a mobile device by the provisioning authority based on a service provider profile. At step 1101, the provisioning authority or service provider hosting the service to be modified determines whether all required information has been provided. As in the provisioning processes described above, further information may be requested if necessary.

When all information is received or processing of a modify service provisioning request is to continue without any missing information, as determined at step 1101, the service is validated. The provisioning information provided in the provisioning request is checked at step 1102, and at step 1104, it is determined whether the service was validated. The validation may preferably be re-tried at step 1106, possibly after new information is requested from user at step 1108, following a validation failure. If the service cannot be validated and validation will not be re-tried, then processing continues at step 324 (FIG. 3), at step S344 for an external provider, or at corresponding steps in FIG. 7, 8 or 9a. A provisioning response is prepared and returned, records, menus or lists on the mobile device may then be updated to indicate that a modify service error or failure has occurred, and the provisioning process ends. Any changes to a service may be conditional, for example where any further information may be required for completion of processing, the user's service account is not in good standing, and the like.

Upon validation of the service at step 1104, the service provider or the provisioning authority checks to determine if any of the requested changes to the service will affect any other mobile device services, at step 1110. This step is optional, but preferred in order to avoid problems with such related services. A similar check may instead be made at the mobile device, as described above for a delete service provisioning request, while a modify service provisioning request is being prepared, before the modify service provisioning request is submitted to the provisioning authority, or after the service has been modified. If the service is not related to any other mobile device services, or if the related-service check is not performed, the service is then modified by the service provider at step 1111 and the process continues at step S324 or step S344 (FIG. 3) or the corresponding step in FIG. 7, 8 or 9a. A provisioning response to a modify service provisioning request confirms that the service has been modified at the service provider and preferably initiates any required changes to the service or service-related applications at the mobile device. If necessary, further changes to the same service may also be made at a later time through a further modify service provisioning request.

Where the service is related to another device service, such as in the above example of an email account and an email redirection service, the user may be required to reconfigure the other mobile device service to reflect any service changes. Since the provisioning authority preferably manages provisioning of all mobile device services, the provisioning authority may perform this check at step 1110. This related-service check may instead be performed by a service provider, such as the service provider hosting the service to be changed or the service provider hosting the related service.

Where a related mobile device service is found and will be affected by any change requested in the provisioning request, then the provisioning authority or a service provider sends an alert to the mobile device, at step 1112. Alternatively, the modify service processing may be aborted at step 1110, and the modify service provisioning response indicates the reason for the modify service process failure. When the alert is sent to the mobile device at step 1112, processing preferably stops until a response is received from the user of the mobile device. The user further preferably has the option to specify in the response whether he or she wishes to redefine the requested changes, including but in no way limited to specifying new changes or effectively cancelling certain requested changes, and whether the modify service processing should proceed. If the user chooses to redefine the requested changes, by specifying new changes or cancelling some of the requested changes, for example, then the new changes are detected at step 1116, the new changes are made at the service provider system at step 1111, and the modify service processing continues as described above.

The user's response to the alert may instead indicate that the requested changes will not be redefined and that the modify process should either proceed or be aborted, which is determined at step 1118. If the user chooses to proceed with the requested changes, then the changes are made at step 1111 and the process continues at step 324 or step 344. If the user chooses to abort the modify process, no changes to the service are made and the process continues at step 324 or step 344. The modify service provisioning process may also be adapted to abort to step 324 or step 344 as described above after a predetermined amount of time has elapsed without a response to the alert.

Add service provisioning, delete service provisioning and modify service provisioning have been described above and shown in the drawings as separate processes. However, the provisioning application at a mobile device and associated provisioning arrangements at the provisioning authority and service provider systems may be configured to determine a type of any received provisioning request, such that the provisioning process includes common provisioning request preparation, submission, and information extraction and distribution operations, as well as common provisioning response preparation and transmission operations, with different but possibly inter-related processing operations for the particular types of provisioning requests. Incorporation of the add, delete and modify service processes shown in the drawings into a single overall flow diagram for such a combined provisioning process adapted for multiple provisioning request types will be apparent to those skilled in the art.

Thus, a provisioning system and method in accordance with various aspects of the invention may manage multiple provisioning functions for a plurality of internal and external service providers.

Figure 12:
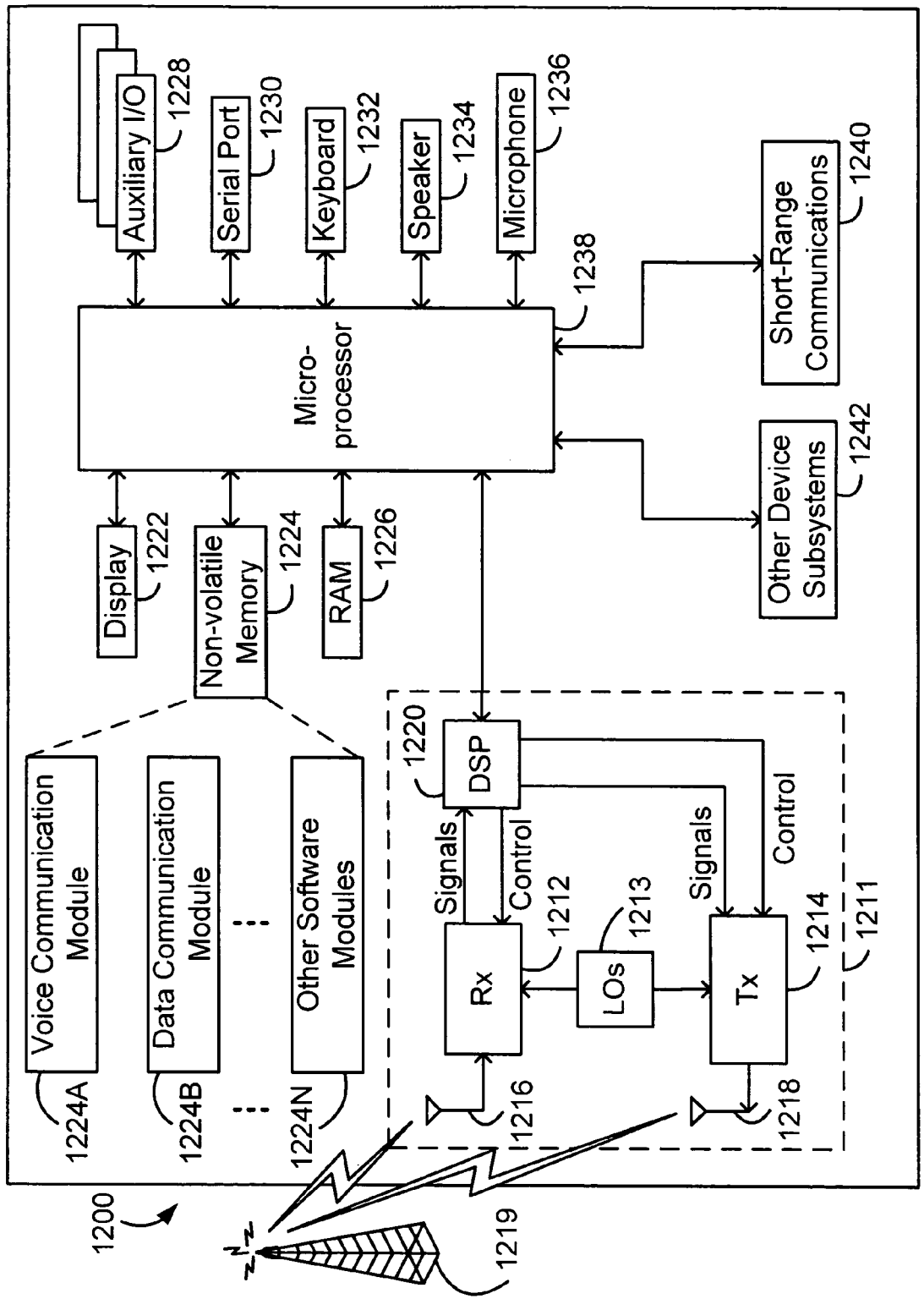
FIG. 12 is a block diagram of a mobile communication device.

Having described provisioning systems and methods, a mobile communication device in which the provisioning application may be installed will now be described. FIG. 12 is a block diagram of a mobile communication device.

The mobile device 1200 is preferably a two-way communication device having at least voice and data communication capabilities. The mobile device 1200 preferably has the capability to communicate with other computer systems on the Internet. Depending on the functionality provided by the mobile device, the mobile device may be referred to as a data messaging device, a two-way pager, a cellular telephone with data messaging capabilities, a wireless Internet appliance, or a data communication device (with or without telephony capabilities). As mentioned above, such devices are referred to generally herein simply as mobile devices.

The mobile device 1200 includes a transceiver 1211, a microprocessor 1238, a display 1222, non-volatile memory 1224, random access memory (RAM) 1226, auxiliary input/output (I/O) devices 1228, a serial port 1230, a keyboard 1232, a speaker 1234, a microphone 1236, a short-range wireless communications sub-system 1240, and other device sub-systems 1242. The transceiver 1211 preferably includes transmit and receive antennas 1216, 1218, a receiver (Rx) 1212, a transmitter (Tx) 1214, one or more local oscillators (LOs) 1213, and a digital signal processor (DSP) 1220. Within the non-volatile memory 1224, the mobile device 1200 includes a plurality of software modules 1224A-1224N that can be executed by the microprocessor 1238 (and/or the DSP 1220), including a voice communication module 1224A, a data communication module 1224B, and a plurality of other operational modules 1224N for carrying out a plurality of other functions. The provisioning application described above may be implemented on the mobile device 1200 as one of the software modules 1224N.

The mobile device 1200 is preferably a two-way communication device having voice and data communication capabilities. Thus, for example, the mobile device 1200 may communicate over a voice network, such as any of the analog or digital cellular networks, and may also communicate over a data network. The voice and data networks are depicted in FIG. 12 by the communication tower 1219. These voice and data networks may be separate communication networks using separate infrastructure, such as base stations, network controllers, etc., or they may be integrated into a single wireless network. References to the network 1219 should therefore be interpreted as encompassing both a single voice and data network and separate networks.

The communication subsystem 1211 is used to communicate with the network 1219. The DSP 1220 is used to send and receive communication signals to and from the transmitter 1214 and receiver 1212, and also exchange control information with the transmitter 1214 and receiver 1212. If the voice and data communications occur at a single frequency, or closely-spaced set of frequencies, then a single LO 1213 may be used in conjunction with the transmitter 1214 and receiver 1212. Alternatively, if different frequencies are utilized for voice communications versus data communications or the mobile device 1200 is enabled for communications on more than one network 1219, then a plurality of LOs 1213 can be used to generate frequencies corresponding to those used in the network 1219. Although two antennas 1216, 1218 are depicted in FIG. 12, the mobile device 1200 could be used with a single antenna structure. Information, which includes both voice and data information, is communicated to and from the communication module 1211 via a link between the DSP 1220 and the microprocessor 1238.

The detailed design of the communication subsystem 1211, such as frequency band, component selection, power level, etc., is dependent upon the communication network 1219 in which the mobile device 1200 is intended to operate. For example, a mobile device 1200 intended to operate in a North American market may include a communication subsystem 1211 designed to operate with the Mobitex or DataTAC mobile data communication networks and also designed to operate with any of a variety of voice communication networks, such as AMPS, TDMA, CDMA, PCS, etc., whereas a mobile device 1200 intended for use in Europe may be configured to operate with the GPRS data communication network and the GSM voice communication network. Other types of data and voice networks, both separate and integrated, may also be utilized with the mobile device 1200.

As described above, communication network access requirements for the mobile device 1200 also vary depending upon the type of network 1219. For example, in the Mobitex and DataTAC data networks, mobile devices are registered on the network using a unique identification number associated with each device. In GPRS networks, access is associated with a subscriber or user of the mobile device 1200. Local or non-network communication functions (if any) may be operable, without the SIM, but the mobile device 1200 is unable to carry out functions involving communications over the network 1219, other than any legally required operations, such as '911' emergency calling. Depending on the configuration of the mobile device 1200 and its provisioning application, network access for the mobile device 1200 may be arranged using the techniques described above.

After any required network registration or activation procedures have been completed, the mobile device 1200 is able to send and receive communication signals, preferably including both voice and data signals, over the network 1219. Signals received by the antenna 1216 from the communication network 1219 are routed to the receiver 1212, which provides for signal amplification, frequency down conversion, filtering, and channel selection, for example, as well as analog to digital conversion. Analog to digital conversion of the received signal allows more complex communication functions, such as digital demodulation and decoding, to be performed using the DSP 1220. In a similar manner, signals to be transmitted to the network 1219 are processed, including modulation and encoding, for example, by the DSP 1220 and are then provided to the transmitter 1214 for digital to analog conversion, frequency up conversion, filtering, amplification and transmission to the communication network 1219 via the antenna 1218. Although a single transceiver 1211 is shown for both voice and data communications, in alternative embodiments, the mobile device 1200 may include multiple distinct transceivers, such as a first transceiver for transmitting and receiving voice signals, and a second transceiver for transmitting and receiving data signals, or a first transceiver configured to operate within a first frequency band, and a second transceiver configured to operate within a second frequency band.

In addition to processing the communication signals, the DSP 1220 also provides for receiver and transmitter control. For example, the gain levels applied to communication signals in the receiver 1212 and transmitter 1214 may be adaptively controlled through automatic gain control algorithms implemented in the DSP 1220. Other transceiver control algorithms could also be implemented in the DSP 1220 in order to provide more sophisticated control of the transceiver 1211.

The microprocessor 1238 preferably manages and controls the overall operation of the mobile device 1200. Many types of microprocessors or microcontrollers could be used here, or, alternatively, a single DSP 1220 could be used to carry out the functions of the microprocessor 1238. Low-level communication functions, including at least data and voice communications, are performed through the DSP 1220 in the transceiver 1211. High-level communication applications, including the voice communication application 1224A, the data communication application 1224B, and the provisioning application are stored in the non-volatile memory 1224 for execution by the microprocessor 1238. For example, the voice communication module 1224A provides a high-level user interface operable to transmit and receive voice calls between the mobile device 1200 and a plurality of other voice devices via the network 1219. Similarly, the data communication module 1224B provides a high-level user interface operable for sending and receiving data, such as e-mail messages, files, organizer information, short text messages, etc., between the mobile device 1200 and a plurality of other data devices via the network 1219.

The microprocessor 1238 also interacts with other device subsystems, such as the display 1222, RAM 1226, auxiliary I/O devices 1228, serial port 1230, keyboard 1232, speaker 1234, microphone 1236, a short-range communications subsystem 1240 and any other device subsystems generally designated as 1242. For example, the modules 1224A-N are executed by the microprocessor 1238 and may provide a high-level interface between a user of the mobile device and the mobile device. This interface typically includes a graphical component provided through the display 1222, and an input/output component provided through the auxiliary I/O devices 1228, keyboard 1232, speaker 1234, or microphone 1236.

Some of the subsystems shown in FIG. 12 perform communication-related functions, whereas other subsystems may provide "resident" or on-device functions. Notably, some subsystems, such as keyboard 1232 and display 1222 may be used for both communication-related functions, such as entering a text message for transmission over a data communication network, and device-resident functions such as a calculator or task list or other PDA type functions.

Operating system software used by the microprocessor 1238 is preferably stored in a persistent store such as the non-volatile memory 1224. In addition to the operating system and communication modules 1224A-N, the non-volatile memory 1224 may include a file system for storing data. The operating system, specific device applications or modules, or parts thereof, may be temporarily loaded into a volatile store, such as RAM 1226 for faster operation. Moreover, received communication signals may also be temporarily stored to RAM 1226, before permanently writing them to a file system located in the non-volatile memory 1224. The non-volatile memory 1224 may be implemented, for example, with Flash memory, non-volatile RAM, or battery backed-up RAM.

Another exemplary application module 1224N that may be loaded onto the mobile device 1200, in addition to the provisioning application described above, is a PIM application providing PDA functionality, such as calendar events, appointments, and task items. This module 1224N may also interact with the voice communication module 1224A for managing phone calls, voice mails, etc., and may also interact with the data communication module 1224B for managing e-mail communications and other data transmissions. Alternatively, all of the functionality of the voice communication module 1224A and the data communication module 1224B may be integrated into the PIM module.

The non-volatile memory 1224 preferably provides a file system to facilitate storage of PIM data items on the device. The PIM application preferably includes the ability to send and receive data items, either by itself, or in conjunction with the voice and data communication modules 1224A, 1224B, via the wireless network 1219. The PIM data items are preferably seamlessly integrated, synchronized and updated, via the wireless network 1219, with a corresponding set of data items stored or associated with a host computer system, thereby creating a mirrored system for data items associated with a particular user.

The mobile device 1200 is manually synchronized with a host system by placing the mobile device 1200 in an interface cradle, which couples the serial port 1230 of the mobile device 1200 to a serial port of the host system. The serial port 1230 may also be used to download other application modules 1224N for installation on the mobile device 1200. This wired download path may further be used to load an encryption key onto the mobile device 1200 for use in secure communications, which is a more secure method than exchanging encryption information via the wireless network 1219.

Additional application modules 1224N may also be loaded onto the mobile device 1200 through the network 1219, through an auxiliary I/O subsystem 1228, through the short-range communications subsystem 1240, or through any other suitable subsystem 1242, and installed by a user in the non-volatile memory 1224 or RAM 1226. Such flexibility in application installation increases the functionality of the mobile device 1200 and may provide enhanced on-device functions, communication-related functions, or both. For example, secure communication applications may enable electronic commerce functions and other such financial transactions to be performed using the mobile device 1200.

When the mobile device 1200 is operating in a data communication mode, a received signal, such as a text message or a web page download, will be processed by the transceiver 1211 and provided to the microprocessor 1238, which preferably further processes the received signal for output to the display 1222, or, alternatively, to an auxiliary I/O device 1228. Owner information, owner control information, commands or requests related to owner information or owner control information, and software applications received by the transceiver 1211 are processed as described above. A user of mobile device 1200 may also compose data items, such as email messages, using the keyboard 1232, which is preferably a complete alphanumeric keyboard laid out in the QWERTY style, although other styles of complete alphanumeric keyboards such as the known DVORAK style may also be used. User input to the mobile device 1200 is further enhanced with the plurality of auxiliary I/O devices 1228, which may include a thumbwheel input device, a touchpad, a variety of switches, a rocker input switch, etc. The composed data items input by the user are then transmitted over the communication network 1219 via the transceiver 1211.

When the mobile device 1200 is operating in a voice communication mode, the overall operation of the mobile device 1200 is substantially similar to the data mode, except that received signals are output to the speaker 1234 and voice signals for transmission are generated by a microphone 1236. In addition, the secure messaging techniques described above might not necessarily be applied to voice communications. Alternative voice or audio I/O devices, such as a voice message recording subsystem, may also be implemented on the mobile device 1200. Although voice or audio signal output is accomplished through the speaker 1234, the display 1222 may also be used to provide an indication of the identity of a calling party, the duration of a voice call, or other voice call related information. For example, the microprocessor 1238, in conjunction with the voice communication module 1224A and the operating system software, may detect the caller identification information of an incoming voice call and display it on the display 1222.

A short-range communications subsystem 1240 is also be included in the mobile device 1200. For example, the subsystem 1240 may include an infrared device and associated circuits and components, or a Bluetooth™ or 802.1™ short-range wireless communication module to provide for communication with similarly-enabled systems and devices. Thus, software applications, PIM data and other information may be enabled on the mobile device 1200 via the serial port 1230 or other short-range communications subsystem 1240.

FIG. 12 represents a specific example of a mobile device in conjunction with which provisioning systems and methods described above may be implemented. Implementation of such systems and methods in other mobile devices having further, fewer, or different components than those shown in FIG. 12 would be obvious to one skilled in the art to which this application pertains and are therefore considered to be within the scope of the present invention. For example, although a SIM card has not been explicitly shown in FIG. 12, it should be appreciated that implementation of provisioning systems and methods in conjunction with mobile devices with SIM cards is contemplated. Since SIM cards currently incorporate a memory component information for a provisioning request, information extracted from a provisioning response, or both, may be stored on a SIM card.

It will be appreciated that the above description relates to the preferred embodiment by way of example only. Many variations on the invention will be obvious to those knowledgeable in the field, and such obvious variations are within the scope of the invention as described and claimed, whether or not expressly described.

For example, although a single provisioning authority preferably provides a provisioning interface between multiple service providers and devices which may use services hosted by such service providers, it will be apparent that more than one such provisioning authority, each serving one or more service providers, may be implemented in a system.

In multiple provisioning authority systems, each authority is preferably adapted to operate with a common provisioning application. However, it is also contemplated that different provisioning authorities may use different provisioning applications. Intermediate interface or translation systems may provide for communication between a mobile device provisioning application and a provisioning authority adapted for a different provisioning application. Alternatively, a mobile device may download a corresponding different provisioning application from a particular provisioning authority, a service provider that uses the particular provisioning authority, or possibly from another provisioning application source such as a central repository of provisioning applications. Depending upon the service to be provisioned, the service provider hosting the service, or its associated provisioning authority, a particular corresponding one of a plurality of stored provisioning applications may be invoked on a mobile device.

Further contemplated aspects of the invention relate to service query and notify functions. In accordance with these aspects of the invention, a mobile device may query a provisioning authority to determine which services may be provisioned via the provisioning authority, and possibly which service providers host such services. If necessary, a user may then download a corresponding provisioning application and provision any desired services using the provisioning application and provisioning authority. A service notify feature may be implemented by a service provider or a provisioning authority as an advertising mechanism, whereby the service provider or provisioning authority notifies mobile devices of available services. A service notify message may be sent to a mobile device upon conclusion of an initial provisioning (activation) operation for the mobile device, as an attachment to or following a transmission of a provisioning response, for example. Such a message might also be sent to all mobile devices that have previously used a particular provisioning authority or service provider, when a new service or service provider becomes available.

Those skilled in the art will also appreciate that other alternate provisioning interfaces in addition to those shown in the drawings may be provided. One such alternate interface that may not be immediately apparent is another mobile communication device. For example, a user may wish to provision mobile device services using a mobile device on which a provisioning application has not been installed, or perhaps when the mobile device is out of mobile communication network coverage or would incur roaming charges for any network communications. If the mobile device and a second available mobile device are enabled for short-range communications as described above, then "proxy" type provisioning may be possible. The second mobile device may download, if necessary, the appropriate provisioning application. Any information required for the intended provisioning operation is transferred from the first mobile device to the second mobile device via the short-range link, and the provisioning application on the second mobile device prepares and submits the provisioning request and receives the provisioning response on behalf of the user of the first mobile device. If the provisioning application is resident on the first mobile device, then the provisioning application may be transferred to the second mobile device from the first device via the short-range communications link if necessary, or the provisioning request could be prepared on the first mobile device and submitted to the provisioning authority via the second mobile device. The provisioning response may then be received by the second mobile device and similarly transferred to the first mobile device via the short-range link.

What is claimed as the invention is:

1. A method of provisioning multiple services for a mobile communication device, comprising the steps of:
   receiving and processing identity access information;
   receiving a provisioning request for managing a service provided by a first communication service and a service provided by a second communication service, the provisioning request including provisioning information and specifying a provisioning operation, the first communication service and a the second communication service;
   processing the provisioning information to determine whether the provisioning operation may be performed for the second communication service; and
   where the provisioning operation may be performed for the second communication service, then:
      performing the provisioning operation for the second communication service;
      processing the provisioning information to determine whether the provisioning operation may be performed for the first communication service;
      performing the provisioning operation for the first communication service where the provisioning operation may be performed for the first communication service;
      preparing a provisioning response indicating that the provisioning operation was successful; and
      sending the provisioning response to the mobile communication device; and
   where the provisioning operation may not be performed for the second communication service, then:
      processing the provisioning information to determine whether the provisioning operation may be performed for the first communication service;
      performing the provisioning operation for the first communication service where the provisioning operation may be performed for the first communication service;
      preparing a provisioning response indicating that the provisioning operation was unsuccessful for the second communication service but successful for the first communication service; and
      sending the provisioning response to the mobile communication device.

2. The method of claim 1, wherein the step of receiving a provisioning request comprises the step of receiving the provisioning request from the mobile communication device.

3. The method of claim 1, further comprising the step of receiving a further provisioning request including further provisioning information and specifying the provisioning operation for the second communication service.

4. The method of claim 1, wherein the provisioning operation is a service activation.

5. The method of claim 4, wherein the second communication service is provided by a first service provider.

6. The method of claim 5, further comprising the step of:
   determining whether the second communication service is available from a second service provider where the provisioning operation may not be performed for the second communication service;
   wherein the provisioning response indicating that the provisioning operation was unsuccessful for the second communication service but successful for the first communication service further indicates whether the second communication service is available from the second service provider.

7. The method of claim 6, further comprising the step of receiving a further provisioning request including further provisioning information and specifying the provisioning operation for the second communication service.

8. The method of claim 7 wherein, the further provisioning request specifies the provisioning operation for the second service provider where the second communication service is available from the second service provider.

9. The method of claim 1, further comprising the steps of:
   where the provisioning operation may not be performed for the second communication service, then:
   aborting the provisioning operation;
   preparing a provisioning response indicating that the provisioning operation was unsuccessful; and
   sending the provisioning response to the mobile communication device.

10. The method of claim 1, further comprising the steps of:
    where the provisioning operation may not be performed for the second communication service, then:
    aborting the provisioning operation;
    preparing a provisioning response indicating that the provisioning operation was unsuccessful for the first communication service; and
    sending the provisioning response to the mobile communication device.

11. The method of claim 10, wherein:
    the step of aborting the provisioning operation comprises the step of reversing the provisioning operation for the second communication service.

12. The method of claim 1, wherein the second communication service is an electronic messaging service.

13. The method of claim 12, wherein the electronic messaging service is email service.

14. The method of claim 13, wherein the first communication service is an email redirection service which redirects email received at an email system to the mobile communication device.

15. The method of claim 14, wherein the step of performing the provisioning operation for the first communication service comprises the step of establishing a forwarding rule at the email system.

16. The method of claim 1, wherein the second communication service is provided by a first service provider.

17. The method of claim 16, wherein the first service is provided by the first service provider.

18. The method of claim 16, wherein the first service is provided by a second service provider.

\* \* \* \* \*

UNITED STATES PATENT AND TRADEMARK OFFICE
CERTIFICATE OF CORRECTION

| | |
|---|---|
| PATENT NO. | : 7,817,988 B2 |
| APPLICATION NO. | : 10/489433 |
| DATED | : October 19, 2010 |
| INVENTOR(S) | : Kruis et al. |

It is certified that error appears in the above-identified patent and that said Letters Patent is hereby corrected as shown below:

Column 34, line 10, please replace "service and a the second" with -- service and the second --

Signed and Sealed this

Twenty-first Day of December, 2010

David J. Kappos
*Director of the United States Patent and Trademark Office*